United States Patent
Stafford

(10) Patent No.: US 8,230,568 B2
(45) Date of Patent: Jul. 31, 2012

(54) BATHTUB ACCESSORY DEVICE AND METHOD

(75) Inventor: Christopher Brian Stafford, Fairfield, OH (US)

(73) Assignee: Safeway Safety Step, LLC, Fairfield, OH (US)

( * ) Notice: Subject to any disclaimer, the term of this patent is extended or adjusted under 35 U.S.C. 154(b) by 87 days.

(21) Appl. No.: 12/869,408

(22) Filed: Aug. 26, 2010

(65) Prior Publication Data

US 2011/0099787 A1 May 5, 2011

Related U.S. Application Data

(60) Provisional application No. 61/237,105, filed on Aug. 26, 2009.

(51) Int. Cl.
*B21K 21/00* (2006.01)
*A47K 3/02* (2006.01)
*A47K 3/022* (2006.01)

(52) U.S. Cl. .......... 29/401.1; 29/525.01; 29/525.02; 29/525.11; 4/538; 4/559; 4/571.1; 4/584

(58) Field of Classification Search .......... 29/401.1, 29/402.03, 402.08, 402.09, 402.12, 402.13, 29/402.14, 402.15, 402.16, 525.01, 525.02, 29/525.11; 4/540, 555, 556, 557, 559, 571.1, 4/573.1, 576.1, 577.1, 578.1, 579, 538, 584, 4/604, 611

See application file for complete search history.

(56) References Cited

U.S. PATENT DOCUMENTS

| | | | | |
|---|---|---|---|---|
| 3,416,166 A | * | 12/1968 | Hanson | 4/555 |
| 5,184,358 A | * | 2/1993 | Gruidel et al. | 4/555 |
| 5,463,780 A | * | 11/1995 | Harris et al. | 4/604 |
| 5,606,751 A | * | 3/1997 | Baker | 4/560.1 |
| 5,628,851 A | * | 5/1997 | Lawler | 156/98 |
| 6,212,704 B1 | * | 4/2001 | Peterson | 4/555 |
| 6,226,810 B1 | * | 5/2001 | Weddendorf et al. | 4/579 |
| 6,256,806 B1 | * | 7/2001 | DiTommaso | 4/560.1 |
| 6,334,225 B1 | * | 1/2002 | Brinkmann | 4/560.1 |
| 6,430,759 B1 | * | 8/2002 | Beltran | 4/576.1 |
| 6,615,420 B1 | * | 9/2003 | Hyden et al. | 4/579 |
| 2008/0109954 A1 | * | 5/2008 | Neidich | 4/556 |

* cited by examiner

*Primary Examiner* — Jermie Cozart
(74) *Attorney, Agent, or Firm* — Ulmer & Berne LLP

(57) ABSTRACT

Provided is bathtub accessory product and installation method. The bathtub accessory product is designed to be secured to a bathtub wall and have a universal end that permits the attachment of any number of bath accessories such as a grab bar or swivel seat. The bathtub accessory may be installed within the inner cavity of a bathtub to ensure a secure fit while also allowing ideal placement of a bath accessory for use by a bather.

20 Claims, 30 Drawing Sheets

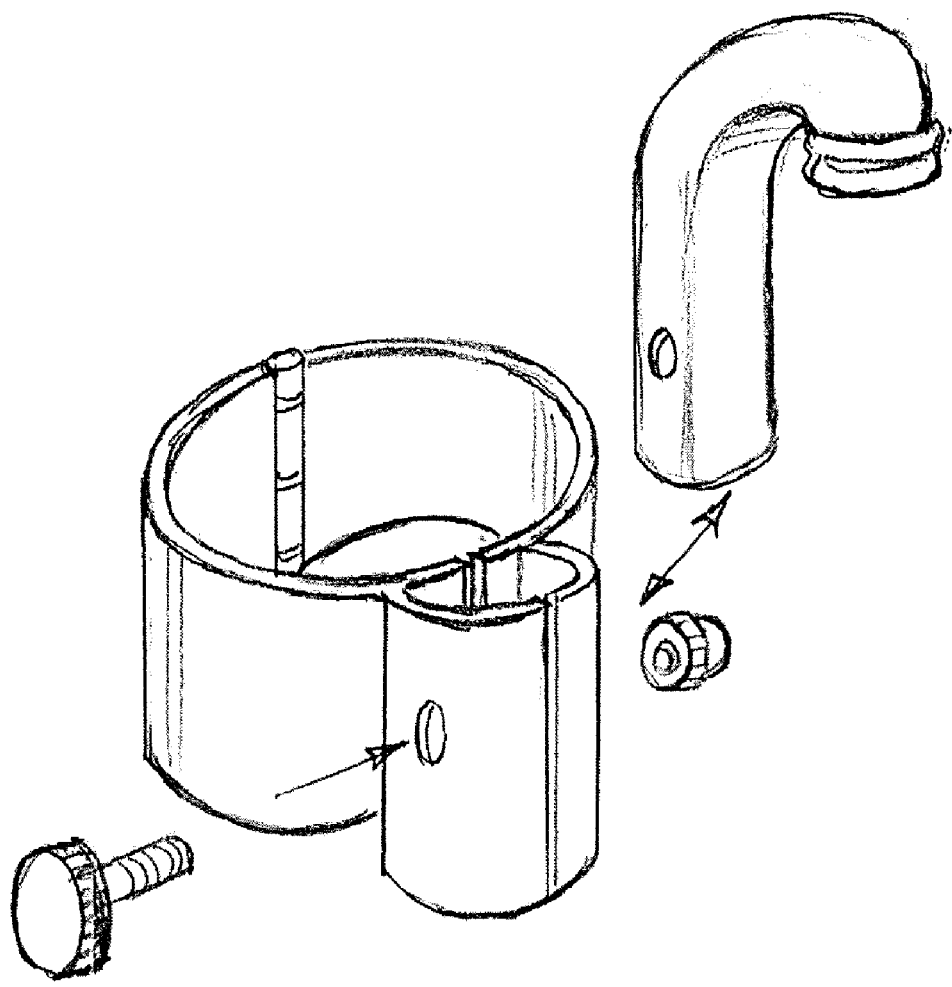
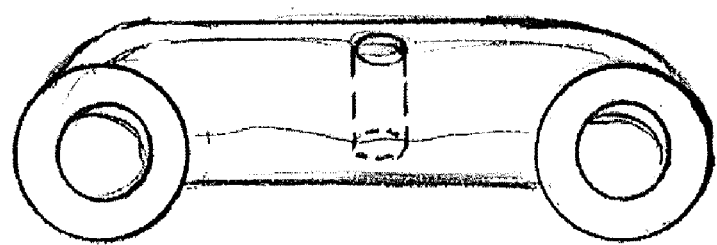
Fig. 24

BATHTUB ACCESSORY DEVICE AND METHOD

PRIORITY

This application claims priority to and benefit of U.S. Provisional application No. 61/237,105, entitled "Bathtub Accessory Device and Method", filed on Aug. 26, 2009, which is herein incorporated by reference in its entirety.

FIELD

Embodiments of the present invention relate, in general, to a bathtub accessory device, and, in particular, to devices and methods of use relating to a universal bathtub device that may attach to any number of accessories such as a grab bar or swivel seat.

BACKGROUND

Many individuals, particularly the elderly and those suffering from arthritis, debilitating injury, handicap, and/or general loss of mobility, may have difficulty maneuvering around a bathroom. Falls in and around the bathroom are a leading cause of injury in the U.S. In particular, individuals with the aforementioned conditions may have trouble entering or exiting the bathtub area, or they may have difficulty managing the bathtub or shower equipment once in the tub. As a result, these persons may forego taking a bath or shower altogether and settle for alternate bathing methods, such as sponge baths and the like. Many people, however, find such alternative bathing methods unsatisfactory as this often represents a loss of independence.

Devices, such as grab bars, have been developed to alleviate some of these concerns, however, these features may be limited in where and how they can be positioned in the tub to provide the utmost utility to a bather. For example, a grab bar may have to be positioned on a wall having proper support (e.g., lumber studs, etc.). Placement of such features may not be based on location of proper support, which may lead to a less than optimal placement and design that could limit the safety and/or convenience benefits of the retrofit feature.

BRIEF DESCRIPTION OF THE DRAWINGS

The accompanying drawings incorporated in and forming a part of the specification illustrate several aspects of the present disclosure, and together with the description serve to explain the principles of the invention; it being understood, however, that the described embodiments are not limited to the precise arrangements shown. In the drawings, like reference numerals refer to like elements in the several views. In the drawings:

FIG. 24 is a perspective view of a clamp configured for attachment to a post or other member to allow for the attachment of accessories.

DETAILED DESCRIPTION

The following description of certain examples should not be used to limit the scope of the present invention. Other features, aspects, and advantages of the versions disclosed herein will become apparent to those skilled in the art from the following description, which is by way of illustration, one of the best modes contemplated for carrying out the invention. As will be realized, the versions described herein are capable of other different and obvious aspects, all without departing from the invention. Accordingly, the drawings and descriptions should be regarded as illustrative in nature and not restrictive.

As shown in the figures, versions illustrated herein comprise devices related to and methods for installing retrofit bathtub accessories including, for example, grab bars, seats, caddies, side caddies, trays, swivel seats, transfer seats, benches, grab pillars, posts, safety call systems, electrical and/or battery operated applications, hooks, lighting, products designed for the handicapped, products designed for children or infants, products designed for pet care or bathing, and/or products designed for aesthetic or entertainment purposes. Versions described herein allow for products or accessories, such as those described herein, to be detachably coupled or permanently attached to a bathtub in a manner that provides for a secure attachment without leakage. In one version, one or a plurality of universal connectors are coupled with a bathtub to allow for accessories, such as safety accessories, to be attached and interchanged as necessary. Providing a secure attachment point may allow for the ideal placement of features, such as grab bars, that may diminish the risk of accidents associated with the access and use of bathroom facilities. Providing couplings in accordance with versions described herein may facilitate the attachment and use of desirable features without disturbing the strength and integrity of a bathtub.

Figure 1:
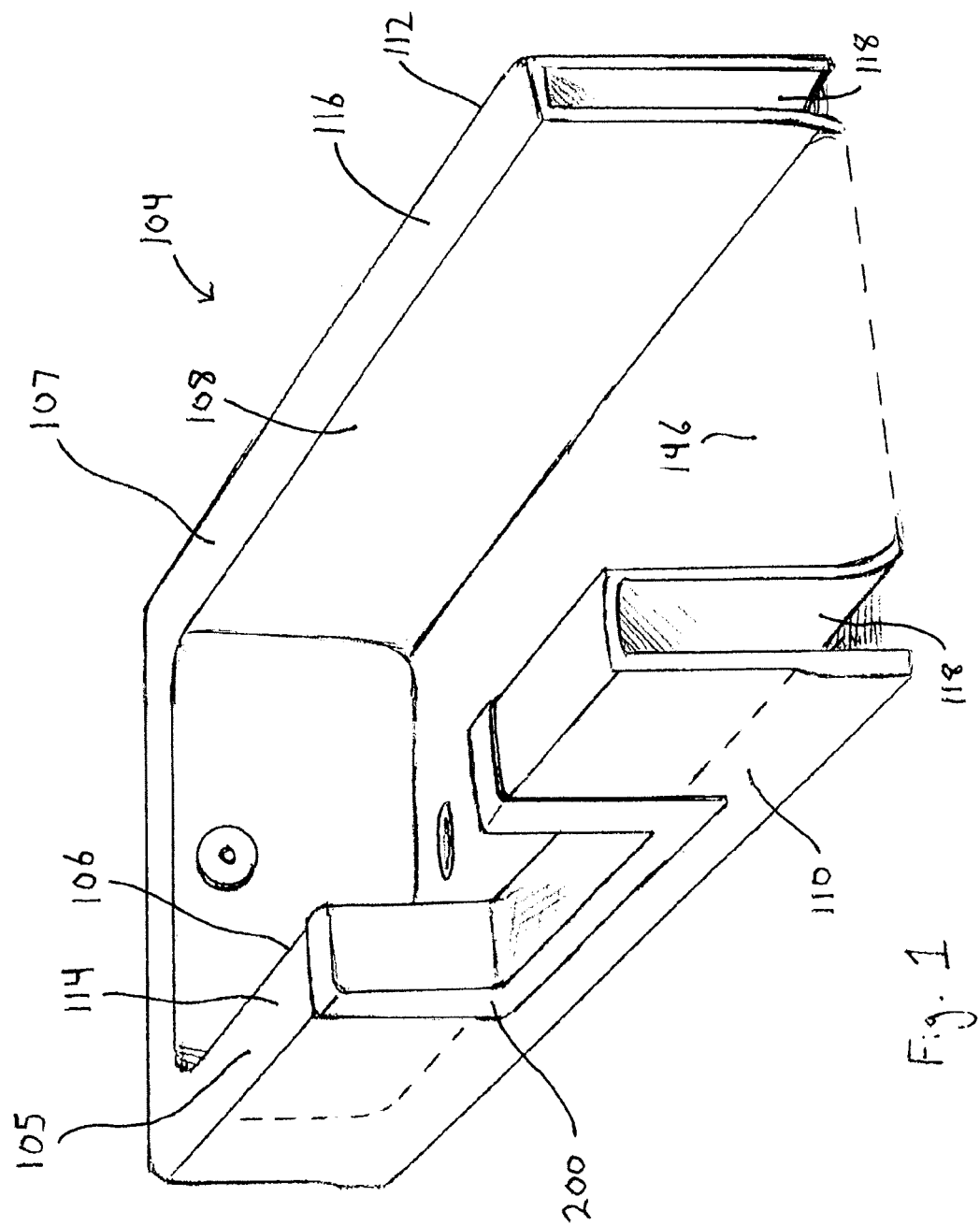
FIG. 1 is a cross-sectional view of a typical bathtub shown with an inner bathing cavity defined by side walls, where the bathtub is also shown with a retrofit cutout to permit easy access into the inner cavity of the bathtub.

FIG. 1 illustrates a cross-sectional perspective view of a typical bathtub (104) shown with a retrofit saddle (200) to facilitate access into a bathtub. Retrofit doors or saddles, such as that shown in FIG. 1 may be, for example U.S. Pat. No. 6,272,698, to Stafford, issued Aug. 14, 2001, which is herein incorporated by reference in its entirety. Providing a retrofit saddle, door, or the like often requires cutting away a portion of the bathtub (104) to permit the installation of the retrofit access means. As illustrated in FIG. 1, the bathtub (104) includes a first longitudinal sidewall (105) and a second longitudinal sidewall (107). The first longitudinal sidewall (105) includes an inner surface (106), a top surface (114), and an outer surface (110), where these surfaces define an inner cavity (118) that may extend around the circumference or a portion of the circumference of the bathtub (104). The second longitudinal sidewall (107) includes an inner surface (108), a top surface (116), and an outer surface (112), where these surfaces further define inner cavity (118). As will be understood by one of ordinary skill in the art, bathtub (104) may be made of any suitable material or composite. By way of example only, bathtub (104) may be made of cast iron, steel, fiberglass, or acrylic, or any combination of these materials and have any suitable shape or configuration.

When greater access to a traditional bathtub is desirable, such as where an elderly individual has trouble stepping over the sidewall of a bathtub, a retrofit cutout, saddle, and/or door may be provided to mitigate these issues. During the installation of such a system, such as those described in the '698 patent to Stafford, at least a portion of the sidewall (105) is cut away from the bathtub (104) that is generally the shape of the retrofit saddle (200), or the like, that will be placed in the opening. During installation of the saddle (200), or other fitting, the cut away portion of the bathtub (104) exposes the inner cavity (118) of the bathtub. In versions described herein, the exposure of the inner cavity (118) facilitates the insertion and placement of coupling systems, components, and devices that allow bathtub accessories to be coupled with the bathtub (104) in a secure and aesthetic manner. Upon placement of such accessory systems the saddle (200), for example, may be placed over the cutout in the bathtub to return the integrity of the bathtub (104).

Figure 2:
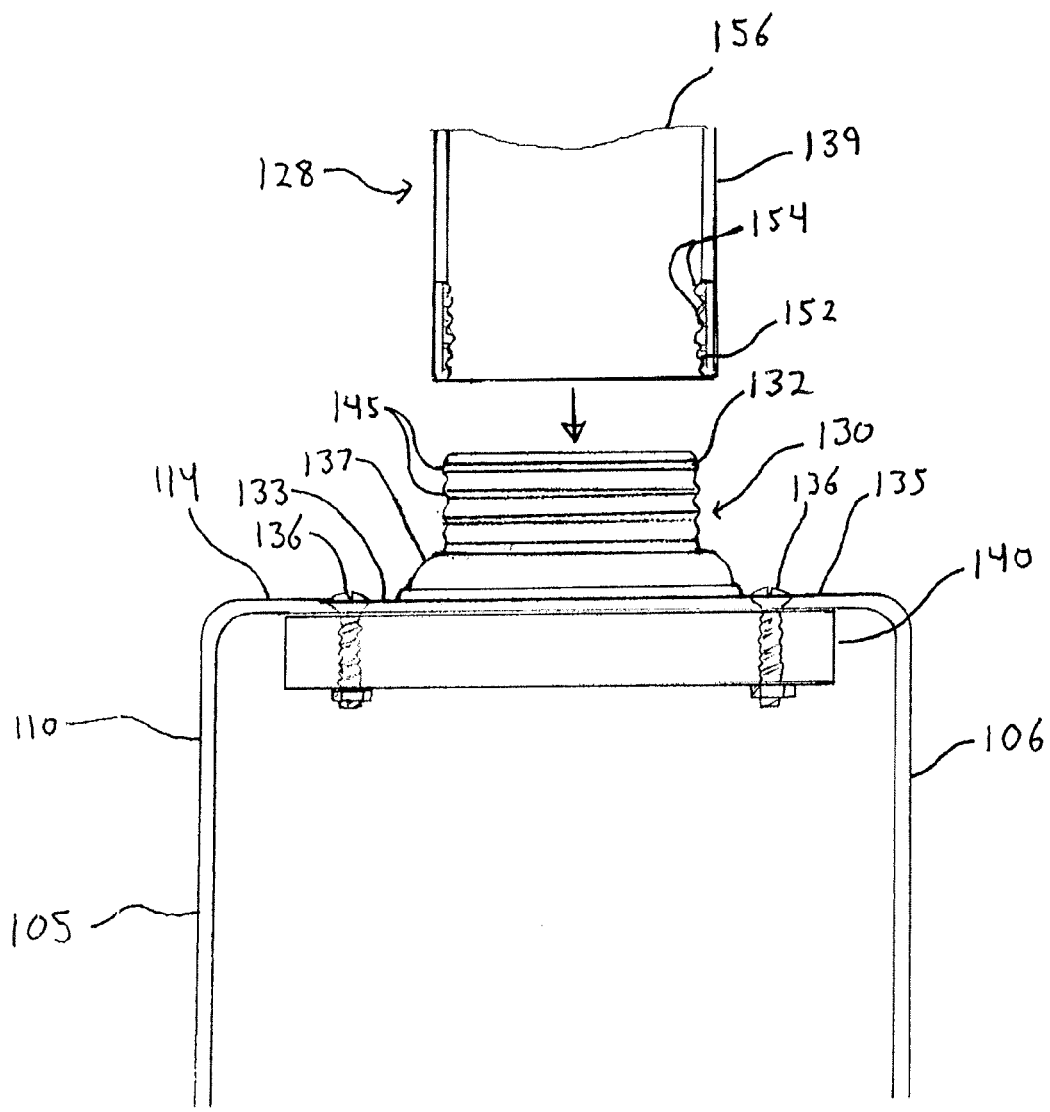
FIG. 2 is a side view of one version of a connector device for bathtub attachments that is coupled with the side wall of the bathtub that is shown in FIG. 1.

Referring to FIG. 2, one version of a universal connector (130) is shown coupled with the top surface (114) of the first sidewall (105) of the bathtub (114). Further illustrated is a coupling (128) for a bathtub accessory, where the coupling (128) corresponds to and can be detachably coupled to the universal connector (130). The universal connector (130) further comprises a male portion (132) having a plurality of flexible flanges (145), a base (137), lateral flanges (133, 135), a support block (140), and one or a plurality of fasteners (136) such as, for example, one or a plurality of nut and bolt fasteners or toggle bolts. During installation, after access to the inner cavity (118) has been provided, the universal connector (130), base (137), and flanges may be placed at a desired position on the bathtub (104), such as on the top surface (114) of the first sidewall (105) adjacent a saddle (200). Once the universal connector has been positioned, the support block may be placed underneath the top surface (114) opposite the universal connector (130), where one or a plurality of fasteners (136) may then be used to couple the flanges (133, 135) to the support block (140), thereby securing the universal connector (130) to the top surface (114). By providing support for the universal connector below the top surface (114), the universal connector may be more resistant to leakage and more able to bear weight than a connector driven only through the top surface of the bathtub (104).

In one version, the base (137) of the universal connector (130) is placed on top of the top surface (114), where only the fasteners (136) project through the top surface (114) to engage the support block (140). The flanges (133, 135) may have holes (not shown) that are pre-aligned with holes (not shown) in the support block (140) to facilitate coupling or, in the alternative, the installer could drill holes through the flanges into the support block. In one version, a seal or gasket (not shown) may be positioned under the base (137) and/or flanges (133, 135), and/or above the support block (140), to help create a watertight seal after installation. In an alternate version, the universal coupler and the support block may be integral, where a hole corresponding to the size of the universal coupler is formed in the top surface (114). In this version, the support block (140) can be inserted into the inner cavity (118) and the universal connector is inserted through the hole in the top surface (114). Once positioned, fasteners may be placed through the top surface (114) to secure the universal connector (130) to the top surface (114).

It will be appreciated that the universal connector may be installed in any suitable manner. Installation in accordance with versions described herein may provide sufficient support for a number of accessories, such as a support post, that can for example assist users with entering and exiting a tub. It will be appreciated that the support block, fasteners, and coupling are described by way of example only, where any suitable attachment from the inner cavity (118) of the bathtub (104) is contemplated.

Still referring to FIG. 2, upon installation of a universal connector (130), an accessory having a coupling (128) may be engaged with the universal connector (130). The coupling (128) may include, for example, an engagement surface (152) having a plurality of annular projections (154), where the annular projections (154) are configured to engage the flexible flanges (145) of the universal connector (130). When the coupling (128) is placed over the universal coupler (130), the flexible flanges may engage the annular projections (154) to prevent removal of the coupling (128) until sufficient force is applied to overcome the coupling. An upper portion (156) of the coupling (128) may be associated with a bathtub accessory, such as a seat or caddy. In this manner, a desirable accessory can be coupled to the bathtub (104), where the accessory can be interchanged with other accessories, or removed entirely, depending on the needs of the user. It will be appreciated that any suitable coupling may be engaged with the universal connector (130) including a friction fit, a threaded fitting, a snap fit, a detachable fit, a permanent coupling, or the like. In one version, the universal connector (130) is an accessory, where once installed the accessory will be a permanent feature of the tub. It will be appreciated that universal connector (130) and the coupling (128) may have any suitable shape, such as a triangular shape, polygonal shape, quadrilateral shape, or the like, to facilitate strength, aesthetic appeal, safety, or the like. Fasteners (136) may include screws, nails, adhesives, or the like. The necessary support block (140) needed to support the universal connector (130) and accompanying accessories may depend on the type of accessory to be attached (e.g., whether the accessory will be weight-bearing or not) and the strength of the bathtub (104) material (e.g., whether the tub is manufactured of cast-iron or steel as compared to fiberglass or acrylic).

Although shown in FIG. 2 as being secured to the top surface (114) of sidewall (105) of the bathtub (104), the universal connection (130) can be associated with any suitable location in a bathtub or shower such as, for example, on the outer surface (110), the inner surface (106), and/or the top surface (114) around the perimeter of the bathtub (104). It should also be understood that connector device (130) may be located in other suitable locations in a bathtub (104) or shower. A plurality of universal connectors may also be installed to allow for the installation of multiple components and/or the installation of components having multiple attachment points. Accessories may also be attached to, for example, a universal connector and a bathroom wall, ceiling, or another portion of a bathroom. Connections requiring more support may include embodiments of support systems described herein. It will be appreciated that the connector may be associated with at least one surface of the sidewall by accessing the internal cavity (118) of the sidewall (105) or, in the alternative, the connector could be inserted through the surface of the sidewall (105) without accessing the internal cavity (118), such as by using toggle bolts to secure the connector. In an alternative version, the connector could include a u-shaped bracket that covers the top surface (114) and a portion of the inner surface (106) and outer surface (110) of the sidewall (105). In the alternative version, the u-shaped bracket may be adjustable or otherwise dimensioned such that fasteners need not be inserted through the sidewall (105). It will also be appreciated that connectors could be associated with a retrofit step, retrofit door, or other device installed in a bathtub (104).

Figure 3:
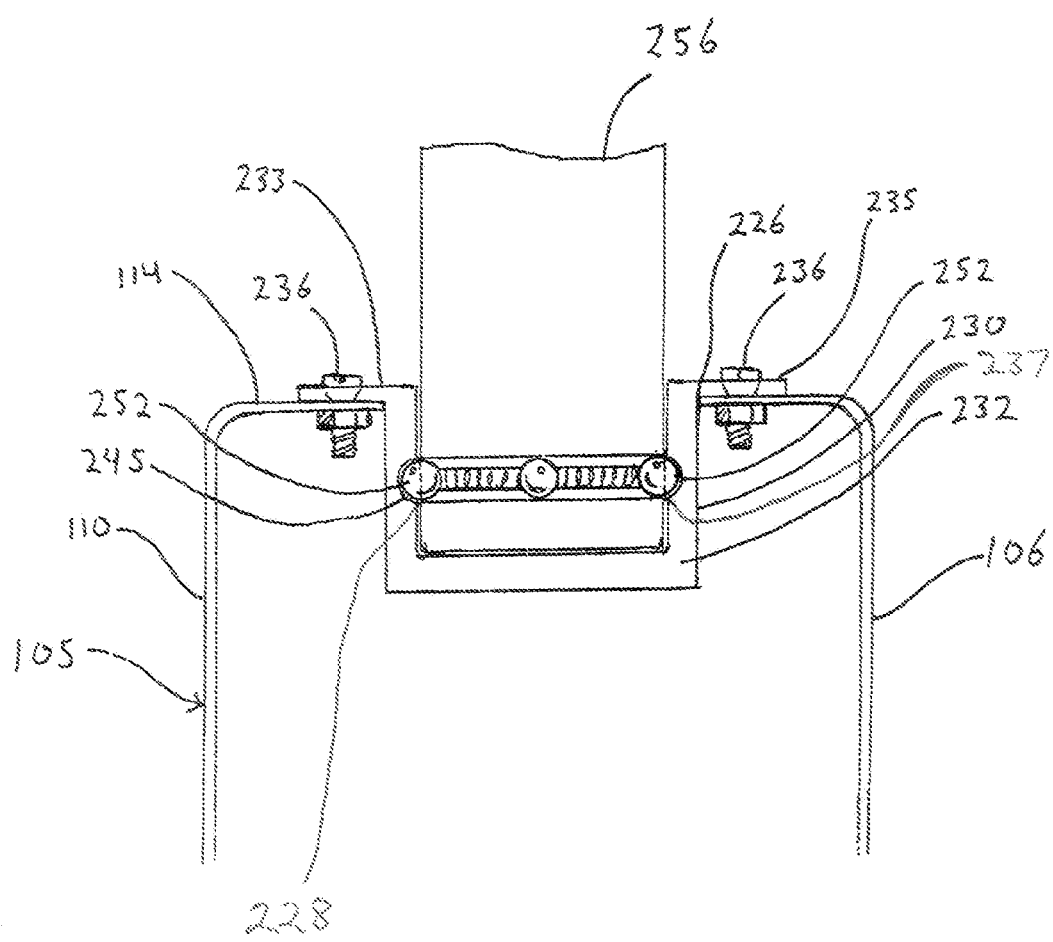
FIG. 3 is a side view of an alternate version of a universal connector device for bathtub attachments that is coupled with the side wall of the bathtub that is shown in FIG. 1.

Referring to FIG. 3, an alternate version of a universal connector (230) is shown coupled with the top surface (114) of the first sidewall (105) of the bathtub (114). Further illustrated is a coupling (228) for a bathtub accessory, where the coupling (228) corresponds to and can be detachably coupled to the universal connector (230). The universal connector (230) further comprises a female portion (232) having an indented portion (237), lateral flanges (233, 235), an engagement surface (245), and one or a plurality of fasteners (236) such as, for example, one or a plurality of nut and bolt fasteners. During installation, after access to the inner cavity (118) has been provided, a hole (226) can be drilled or otherwise formed in the top surface (114) to accept a universal connector. The indented portion (237) of the universal connector (230) can then be inserted through the hole (226) such that the flanges (233, 235) are positioned over and parallel to the top surface (114). Once the universal connector (230) has been positioned, the one or a plurality of fasteners (236) may then be used to couple the flanges (233, 235) to the top surface (114), thereby securing the universal connector (230) to the top surface (114). By providing support for the universal connector below the top surface (114), such as with bolts or fasteners (236) and/or a support plate (not shown), the universal connector may be more resistant to leakage and more able to bear weight than a connector driven only through the top surface of the bathtub (104). Versions that help maintain the integrity of the top surface (114) are also contemplated, such as where magnets are used to secure or to help secure a connector to the sidewall.

The flanges (233, 235) may have preformed holes (not shown) and hardware configured to facilitate coupling or, in the alternative, the installer could drill holes through the flanges. In one version, a seal or gasket (not shown) may be positioned under the female portion (232) and/or flanges (233, 235) to help create a watertight seal after installation.

It will be appreciated that the universal connector may be installed in any suitable manner. Installation in accordance with versions described herein may provide sufficient support for a number of accessories, such as a support post, that can for example assist users with entering and exiting a tub. It will be appreciated that the support block, fasteners, and coupling are described by way of example only, where any suitable attachment is contemplated. Providing an indented or female connector may provide a more aesthetically pleasing design and/or safer design for when an accessory is not being used. For example, it may be desirable to not have a projection sticking up from the bathtub even when an accessory is not engaged. The universal connector (230) may also be configured to accept a cap or seal that will substantially fill the indented portion (237) such that, when an accessory is not being used, the female portion (232) is effectively sealed off.

Still referring to FIG. 3, upon installation of a universal connector (230), an accessory having a coupling (228) may be engaged with the universal connector (230). The coupling (228) may include, for example, an engagement surface (252) having, for example, one or a plurality of pins biased outwardly to couple with the engagement surface (245) on the universal connector (230). For example, the plurality of pins may be depressed as the coupling (228) is inserted into the universal connector (230) and then expand to engage the engagement surface (245) when sufficiently inserted, thereby locking the coupling (228) into place. After the coupling (228) is placed into the universal coupler (230), the coupling (228) may remain engaged until sufficient force is applied to depress the pins and overcome the coupling. An upper portion (256) of the coupling (228) may be associated with a bathtub accessory, such as a seat or caddy. In this manner, a desirable accessory can be coupled to the bathtub (104), where the accessory can be interchanged with other accessories, or removed entirely, depending on the needs of the user. It will be appreciated that any suitable coupling may be engaged with the universal connector (230) including a friction fit, a threaded fitting, a snap fit, a detachable fit, a permanent coupling, or the like. In one version, the universal connector (230) is an accessory and coupling, where once installed the accessory will be a permanent feature of the tub. It will be appreciated that universal connector (230) and the coupling (228) may have any suitable shape, such as a triangular shape, polygonal shape, quadrilateral shape, or the like, to facilitate strength, aesthetic appeal, safety, or the like. Fasteners (236) may include screws, nails, adhesives, or the like.

Although shown in FIG. 3 as being secured to the top surface (114) of sidewall (105) of the bathtub (104), the universal connection (230) can be associated with any suitable location in a bathtub or shower such as, for example, on the outer surface (110), the inner surface (106), and/or the top surface (114) around the perimeter of the bathtub (104). It should also be understood that connector device (230) may be located in other suitable locations in a bathtub (104) or shower. A plurality of universal connectors may also be installed to allow for the installation of multiple components and/or the installation of components having multiple attachment points. For example, multiple connectors may be installed to support a single bench or seat. Accessories may also be attached to, for example, a universal connector and a bathroom wall, ceiling, or another portion of a bathroom. Connections requiring more support may include embodiments of support systems described herein.

Figure 4:
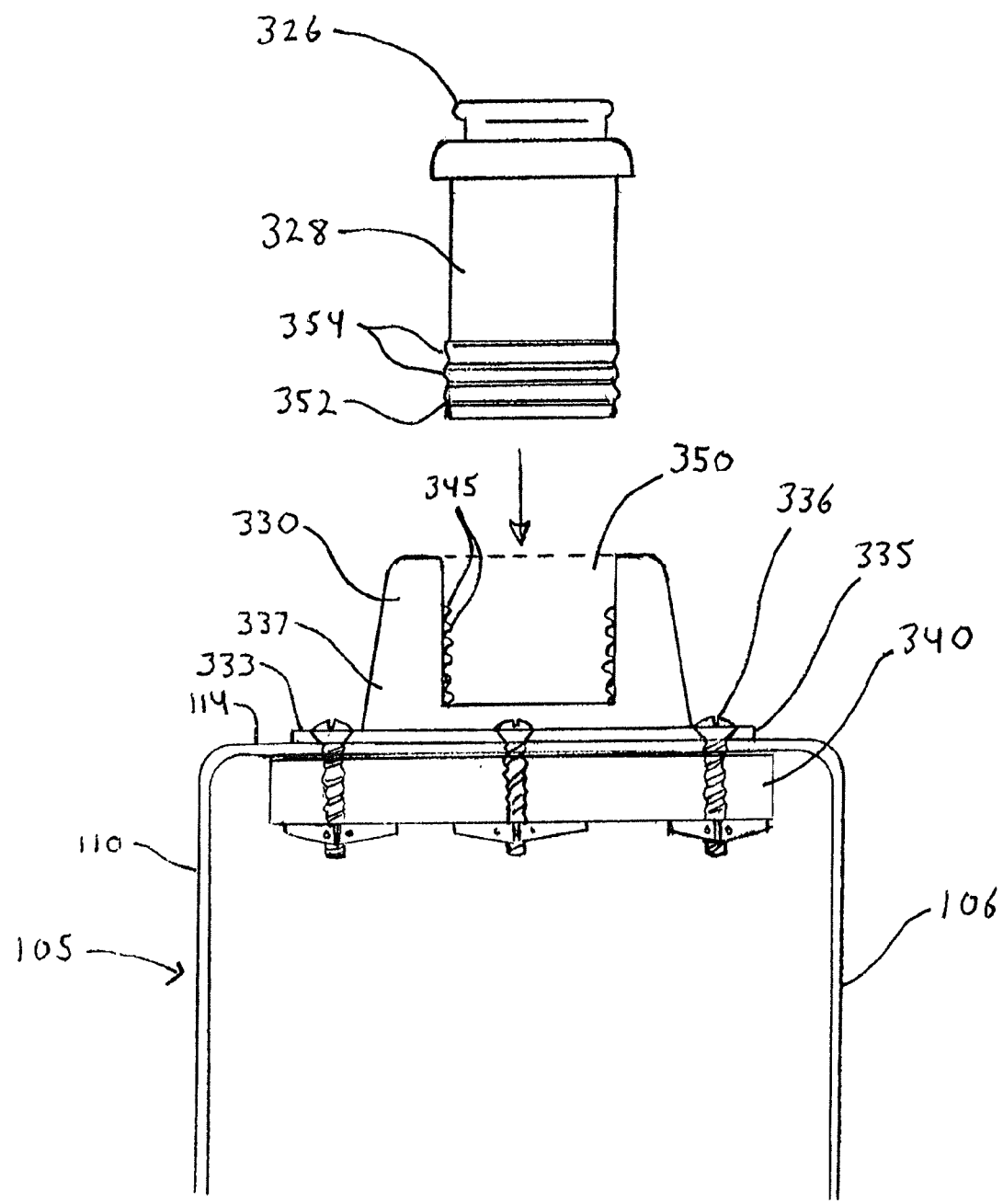
FIG. 4 is a side view of an alternate version of a universal connector device for bathtub attachments that is coupled with the side wall of the bathtub that is shown in FIG. 1.

Referring to FIG. 4, one version of a universal connector (330) is shown coupled with the top surface (114) of the first sidewall (105) of the bathtub (114). Further illustrated is a coupling (328) for a bathtub accessory, where the coupling (328) corresponds to and can be detachably coupled to the universal connector (330). The universal connector (330) further comprises a base (337) having a central threaded bore (350), lateral flanges (333, 335), a support block (340), and one or a plurality of fasteners (336) such as, for example, one or a plurality of toggle bolt fasteners. During installation, after access to the inner cavity (118) has been provided, the universal connector (330), base (337), and flanges (333, 335) may be placed at a desired position on the bathtub (104), such as on the top surface (114) of the first sidewall (105) adjacent a saddle (200). Once the universal connector (330) has been positioned, the support block (340) may be placed underneath the top surface (114) opposite the universal connector (330), where one or a plurality of fasteners (336) may then be used to couple the flanges (333, 335) to the support block (340), thereby securing the universal connector (330) to the top surface (114). By providing support for the universal connector below the top surface (114), the universal connector may be more resistant to leakage and more able to bear weight than a connector driven only through the top surface of the bathtub (104).

In one version, the base (337) of the universal connector (130) is placed on top of the top surface (114), where only the fasteners (336) project through the top surface (114) to engage the support block (340). The flanges (333, 335) may have holes (not shown) that are pre-aligned with holes (not shown) in the support block (340) to facilitate coupling or, in the alternative, the installer could drill holes through the flanges into the support block. In one version, a seal or gasket (not shown) may be positioned under the base (137) and/or flanges (333, 335), and/or above the support block (340), to help create a watertight seal after installation. In an alternate version, the universal coupler and the support block may be integral, where a hole corresponding to the size of the universal coupler is formed in the top surface (114). In this version, the support block (340) can be inserted into the inner cavity (118) and the universal connector is inserted through the hole in the top surface (114). Once positioned, fasteners may be placed through the top surface (114) to secure the universal connector (330) to the top surface (114).

It will be appreciated that the universal connector may be installed in any suitable manner. Installation in accordance with versions described herein may provide sufficient support for a number of accessories, such as a support post, that can for example assist users with entering and exiting a tub. It will be appreciated that the support block, fasteners, and coupling are described by way of example only, where any suitable attachment from the inner cavity (118) of the bathtub (104) is contemplated.

Still referring to FIG. 4, upon installation of a universal connector (330), an accessory having a coupling (328) may be engaged with the universal connector (330). The coupling (328) may include, for example, an engagement surface (352) having threads (354), where the threads (354) are configured to engage the threaded bore (350) of the universal connector (330). The coupling (328) is threaded into the threaded bore (350) of the universal coupler (330) to engage the accessory associated with the coupling (328) with the bathtub (104). An upper portion (356) of the coupling (328) may be associated with a bathtub accessory, such as a seat or caddy. In this manner, a desirable accessory can be coupled to the bathtub (104), where the accessory can be interchanged with other accessories, or removed entirely, depending on the needs of the user. It will be appreciated that any suitable coupling may be engaged with the universal connector (330) including a friction fit, a threaded fitting, a snap fit, a detachable fit, a permanent coupling, or the like. In one version, the universal connector (330) is an accessory, where once installed the accessory will be a permanent feature of the tub. It will be appreciated that universal connector (330) and the coupling (328) may have any suitable shape, such as a triangular shape, polygonal shape, quadrilateral shape, or the like, to facilitate strength, aesthetic appeal, safety, or the like. Fasteners (336) may include screws, nails, adhesives, or the like. The necessary support block (340) needed to support the universal connector (330) and accompanying accessories may depend on the type of accessory to be attached (e.g., whether the accessory will be weight-bearing or not) and the strength of the bathtub (104) material (e.g., whether the tub is manufactured of cast-iron or steel as compared to fiberglass or acrylic).

Although shown in FIG. 4 as being secured to the top surface (114) of sidewall (105) of the bathtub (104), the universal connection (330) can be associated with any suitable location in a bathtub or shower such as, for example, on the outer surface (110), the inner surface (106), and/or the top surface (114) around the perimeter of the bathtub (104). It should also be understood that connector device (330) may be located in other suitable locations in a bathtub (104) or shower. A plurality of universal connectors may also be installed to allow for the installation of multiple components and/or the installation of components having multiple attachment points. Accessories may also be attached to, for example, a universal connector and a bathroom wall, ceiling, or another portion of a bathroom. Connections requiring more support may include embodiments of support systems described herein.

Figure 5:
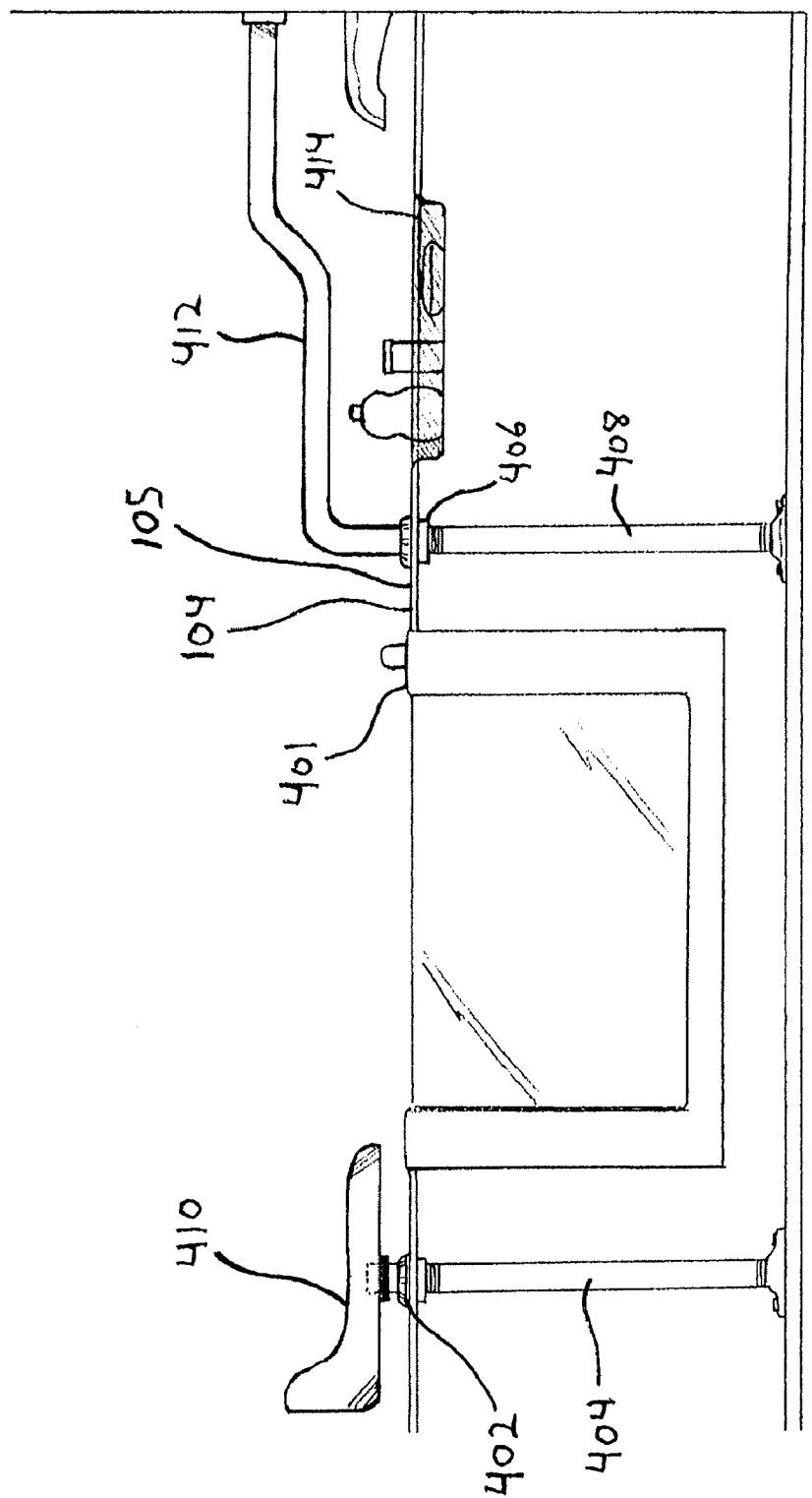
FIG. 5 is a front view of a bathtub shown with a plurality of universal connector devices associated with a plurality of retrofit attachments.

FIG. 5 illustrates a front view of a bathtub (104) having a retrofit door (401), a first universal connector (402) with a first support system (404), a second universal connector (406) with a second support system (408), a swivel seat accessory (410), a rail accessory (412), and a retrofit tray (414). In one version, the various components of the bathtub (104) are incorporated into the bathtub (104) by cutting away a hole in the sidewall (105) for the placement of the retrofit door (401). Once, for example, a u-shaped cutout is formed in the bathtub, the inner cavity (118), shown in FIG. 1, is exposed, which permits access to the interior of the tub. In one version, prior to placement and fixation of the retrofit door, the connectors (402, 406), support systems (404, 408), and retrofit tray (414) are incorporated into the bathtub (104). Allowing access to the inside cavity (118) may allow for support systems (404, 408) to be put into place that can bear significantly more weight than attachments to the outer portion of the tub. Additionally, components such as the retrofit tray (414) may be incorporated into the tub (104) that can easily be sealed from inside the inner cavity (118) and from below the top surface (114) of the sidewall (105). In this manner, components can be associated with a tub that can be implemented in a manner that provides a secure connection that is leak resistant. For example, all components can be caulked or otherwise sealed from within the inner cavity (118) to prevent leakage without unsightly caulking that is visible from the outside. Additionally, foam or other materials may be dispensed into the inner cavity (118) to further prevent leakage of the components. Once the one or a plurality of universal connectors, couplings, connectors, trays, fixed accessories, or the like, have been installed, the retrofit door (401), or any other suitable retrofit components such as a step, can be installed and sealed. Once the inner cavity (118) is sealed, the bathtub (104) will have components, such as the connectors (402, 406) projecting therefrom that are capable of bearing weight and retaining one of a plurality of accessories. As illustrated, an accessory such as a swivel seat (410) or rail (412) may then be coupled with the connectors (402, 406) for use by a bather or caregiver. In one version, the accessories, such as the swivel seat, can be removed and a different accessory can be used with the same connector. With such a set up a kit could be developed for particular applications to provide multiple accessories to be used for different applications. It will be appreciated that the components of FIG. 5 are shown by way of example only, where any suitable configuration is contemplated.

Figure 6:
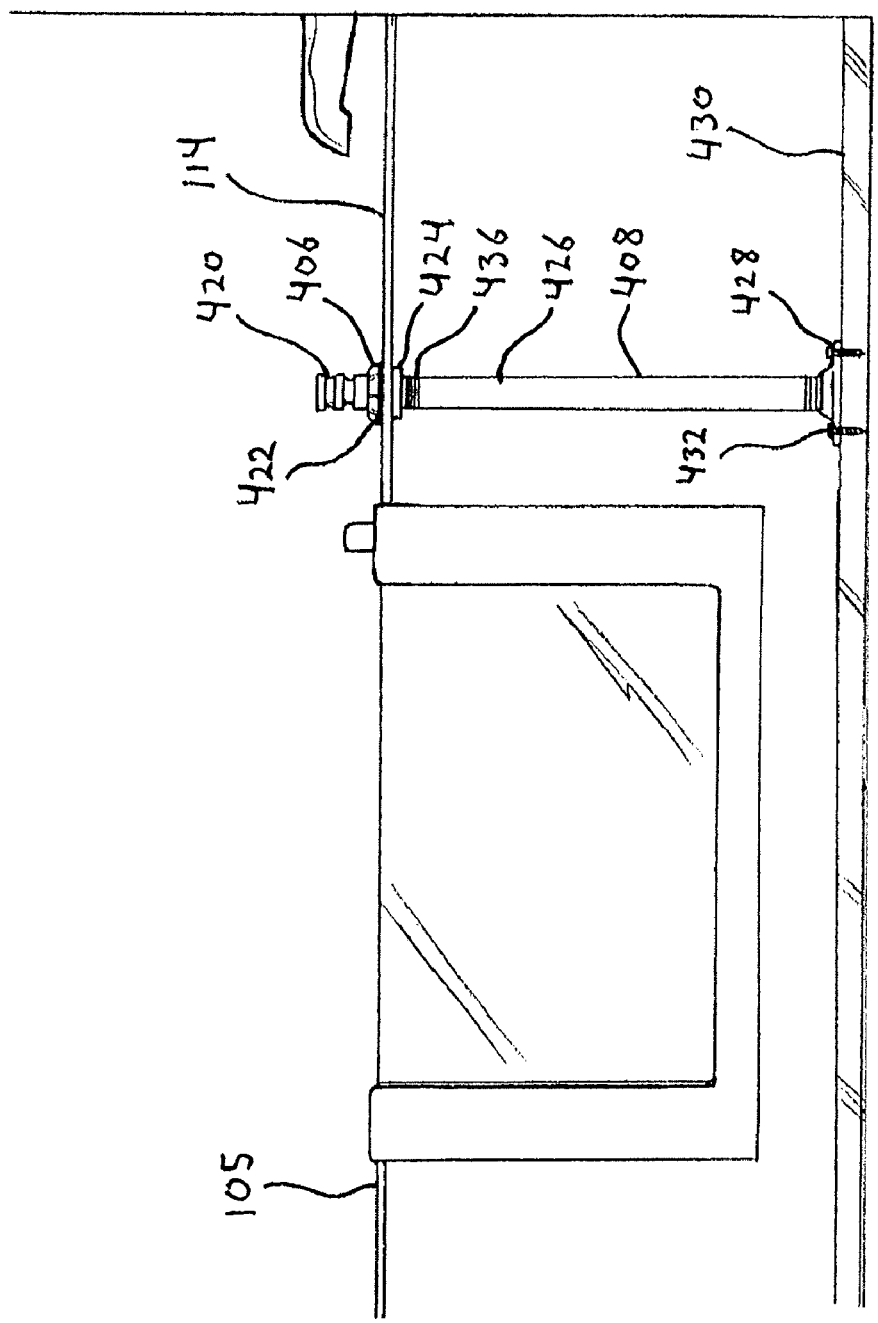
FIG. 6 is a front view of a bathtub showing the connector device of FIG. 5 having a support system.

FIG. 6 illustrates a front view of a sidewall (105) of a bathtub (104) showing a more detailed view of the connector (406) and support system (408) of FIG. 5. The connector (406) comprises a universal coupling (420), a top seal member (422), and a lower seal member (424). The connector (406) is associated with support system (408), which includes a vertical support member (426) attached to a base (428). One version of the base (428) is shown in more detail in FIG. 7. In one version, after cutting away a portion of the sidewall (105) to expose the inner cavity (118), the base (428) of the support system (408) is attached to the floor (430) of the tub (104) with fasteners (432) or with any other suitable attachment means or mechanism. A hole (not shown) may be cut or otherwise formed in the top surface (114) of the sidewall (105) that is sized to accept the connector (406). Once the hole has been formed, a vertical support member (426) of desired size may be inserted through the hole and coupled with the base (428). The bottom of the vertical support member (426) may be threaded and the base (428) may have corresponding threads such that the vertical support member (426) is coupled to the base (428) by screwing the vertical support member (426) into the base (428). The upper portion of the vertical support member (426) may be the universal coupling (420), where the universal coupling (420) is part of a pipe, post, or the like projecting through the hole in the top surface (114) of the sidewall (105).

Figure 8:
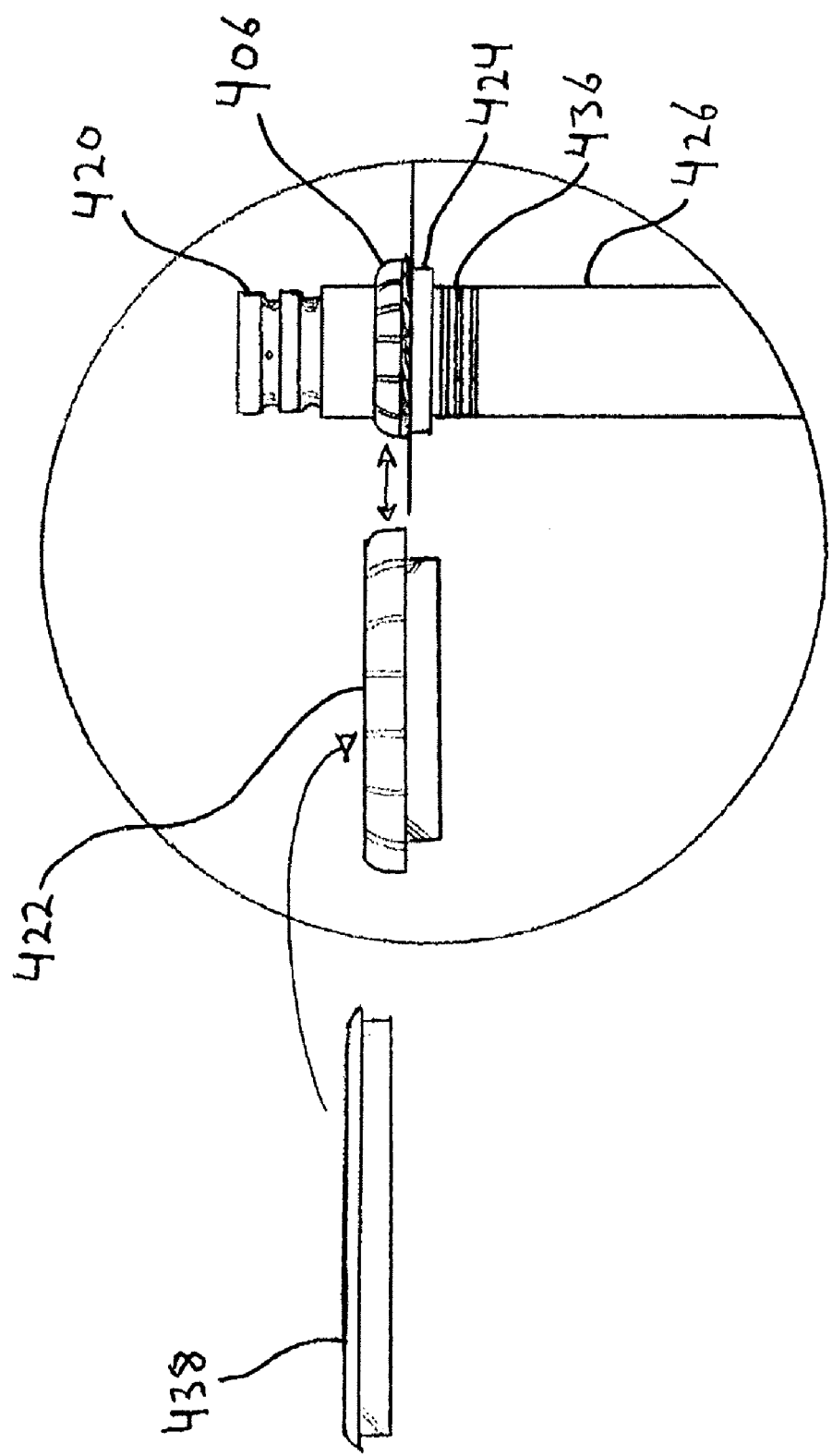
FIG. 8 is a more detailed front view of the universal connector of the connector device of FIG. 5.

Still referring to FIG. 6, in one version the vertical support member (426) includes an upper threaded portion (436) that projects through the hole (not shown) in the top surface (114). Positioned below the top surface (114) is a threaded lower seal member (424) that is threadedly engaged with the upper thread portion (436) of the vertical support member (426) and a threaded top seal member (422) that is also threadedly engaged with the vertical support member (426). Once the vertical support member (426) is positioned, the top seal member (422) can be screwed downward and the lower seal member (424) can be screwed upward to compress the top surface (114) therebetween, thereby creating a watertight seal that secures the vertical support member (426) to the top surface (114). Referring to FIG. 8, the top seal member (422) may also include a gasket, o-ring, or seal (438) positioned between the top seal member (422) and the connector (420) to guard against leakage. It will be appreciated that the lower seal member (424) may include any suitable sealing element and, in one version, the lower seal member (424) is caulked or otherwise fixed with a sealant once properly positioned. Providing a connector (420) as illustrated in FIG. 6 provides for a coupling for accessories that is grounded in the floor and, thus, can potentially bear more weight than a coupling, for example, to only the top surface (114). The illustrated version may be particularly useful with fiberglass or ceramic bathtubs that can bear limited weight without jeopardizing the integrity of the sidewall (105).

Figure 7:
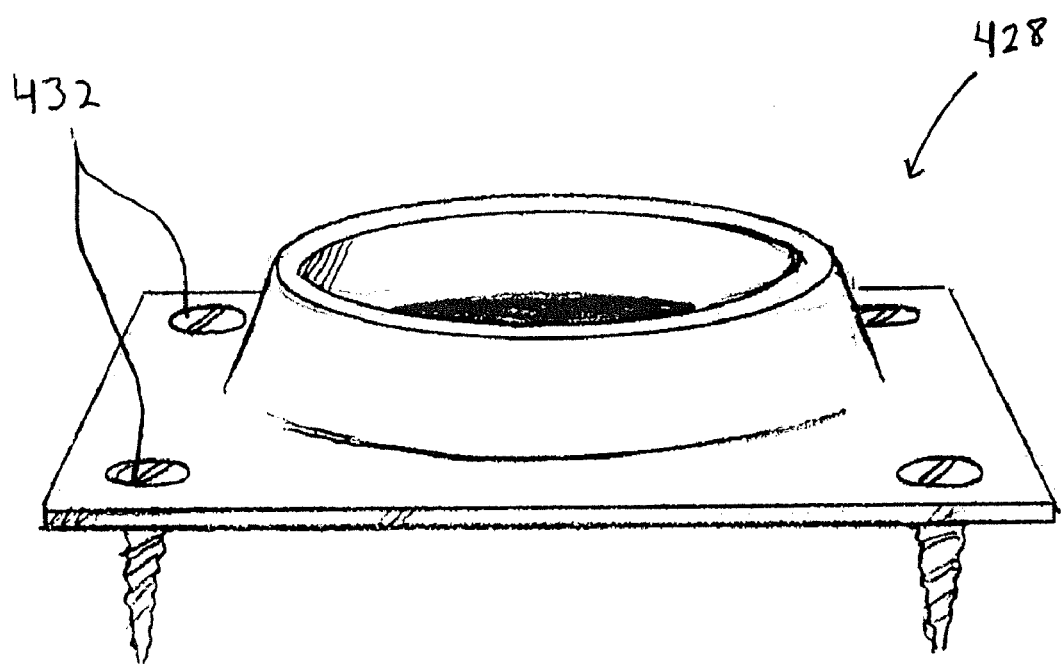
FIG. 7 is a more detailed perspective view of the base member of the connector device of FIG. 6.

It will be appreciated that the configuration of FIGS. 6-8 is provided by way of example only, where any suitable attachment to the floor of the bathtub, any suitable support member, and/or any suitable coupling or connector may be used. For example, the vertical support member (426) and the base (428) may be a single integral component, the upper seal member or lower seal members (422, 424) may be fixed, the vertical support member (426) need not include a threaded portion (436), where the pieces are glued or otherwise affixed to the top surface (114), or the connecter (420) may be a separate component from the vertical support member (426). It will be appreciated that method steps for installation are described by way of example only and can be performed in any suitable order. Providing a grounded support, as illustrated, may permit the installation of seats, such as swivel seats or transfer seats, which must be able to support the weight of a person.

Figure 9:
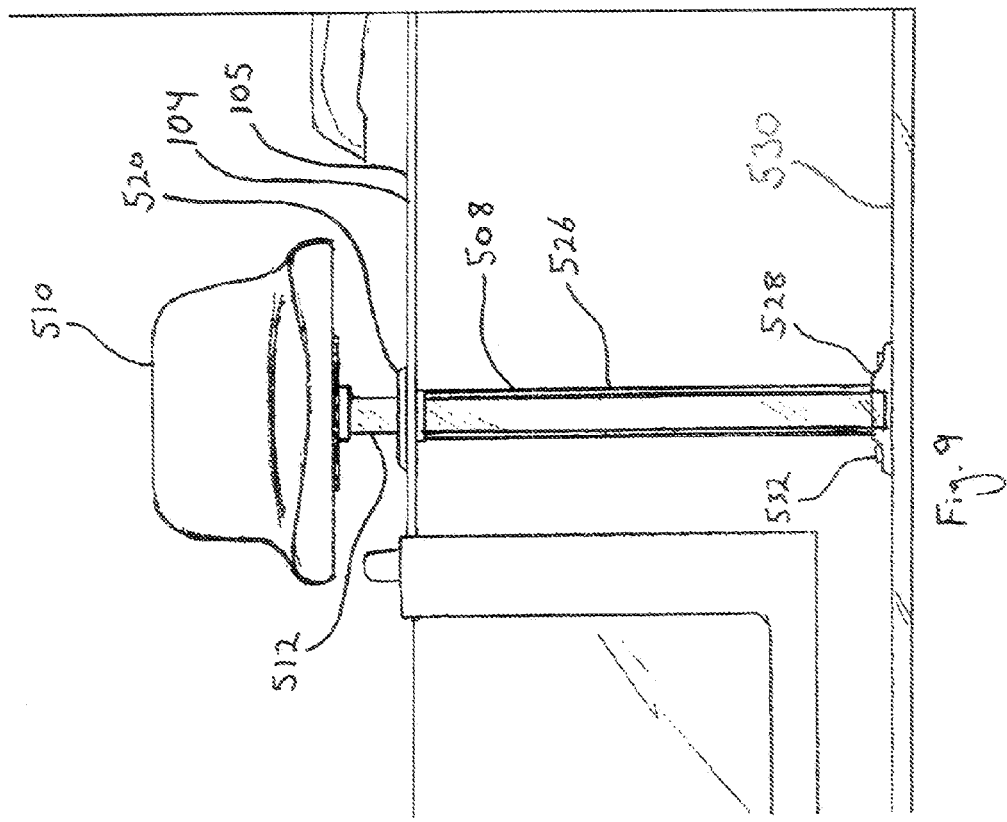
FIG. 9 is a front view of a bathtub showing the side wall of a bathtub having an alternate version of support system associated with a portal.

FIG. 9 illustrates a front view of a sidewall (105) of a bathtub (104) showing an alternate version of a support system (508) for supporting and coupling accessories. The support system (508) includes a vertical support member (526) attached at a lower end to a base (528) and at an upper end to a portal (520). The system shown in FIG. 9 further comprises an accessory (510) associated with a vertical coupling member (512) that is coaxial with the vertical support member (526) of the support system (508). One version of the base (528) is shown in more detail in FIG. 11 and a version of the portal (520) is shown in more detail in FIG. 10.

In one version, after cutting away a portion of the sidewall (105) to expose the inner cavity (118), the base (528) of the support system (508) is attached to the floor (530) of the tub (104) with fasteners (532) or with any other suitable attachment means or mechanism. A hole (not shown) may be cut or otherwise formed in the top surface (114) of the sidewall (105) that is sized to accept the portal (520). Once the hole has been formed, a vertical support member (426) of desired size may be inserted through the hole and coupled with the base (528). The bottom of the vertical support member (526) may have a rotational locking mechanism, where the vertical support member (526) has one or a plurality of L-shaped channels corresponding to lateral projections (536) on the base (528). The vertical support member (526) can be engaged with the lateral projections (536) and, upon engagement, can be rotated to lock the projections into the L-shaped channels. The upper portion of the vertical support member (526) is coupled to the portal (520), for example with a threaded fitting, where the support system (508) creates a sealed outer tube from the portal (520) to the base (528). The vertical support member (526), the base (528), and/or the portal (520) can be caulked or otherwise sealed to create a watertight cavity relative to the inner cavity (118) of the sidewall (115). Once this sealed tubular cavity is created, accessories having a vertical coupling member (512) can be inserted in the cavity to the base (528). Any water falling into the tubular cavity will not be able to seep into the inner cavity (118). As illustrated, an accessory (510) having a vertical support member can be inserted through the portal (520) such that the floor (530) of the tub serves as the load bearing surface. In this manner, accessories can be utilized that bear a significant load, such as swivel chairs or transfer seats. The illustrated version may be particularly useful with fiberglass or ceramic bathtubs that can bear limited weight without jeopardizing the integrity of the sidewall (105).

Figure 10:
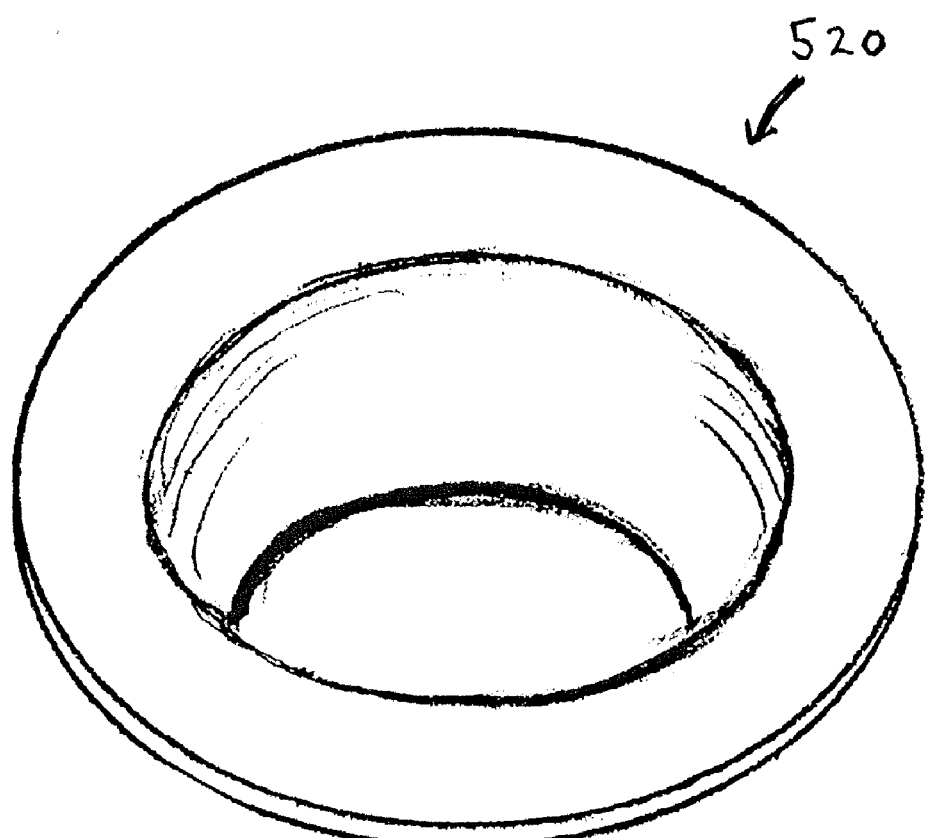
FIG. 10 is a perspective view of the portal shown in FIG. 9.
Figure 11:
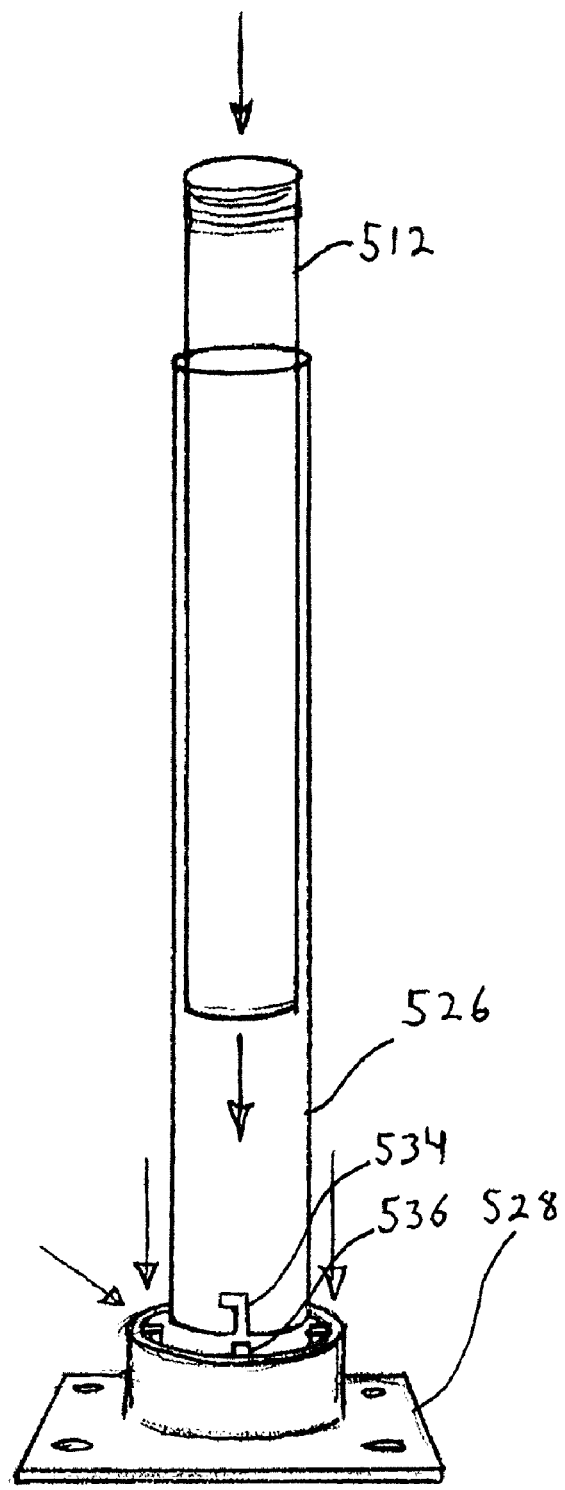
FIG. 11 is a perspective view of the support and coupling system shown in FIG. 9.

It will be appreciated that the configuration of FIGS. 9-11 is provided by way of example only, where any suitable attachment to the floor of the bathtub, any suitable support member, and/or any suitable portal or access point in the top surface (114) may be used. For example, the vertical support member (526) and the base (528) may be a single integral component, the portal (520) may contain a seal to prevent water leakage into the tubular cavity of the vertical support member (526), or where the vertical coupling member (512) is a telescoping component associated with the vertical support member (526). It will be appreciated that method steps for installation are described by way of example only and can be performed in any suitable order. Providing a grounded support, as illustrated, may permit the installation of seats, such as swivel seats or transfer seats, which must be able to support the weight of a person. Versions of all of the couplers or connectors described herein may include caps or seals to close off the coupling when an accessory is not in use.

Figure 12:
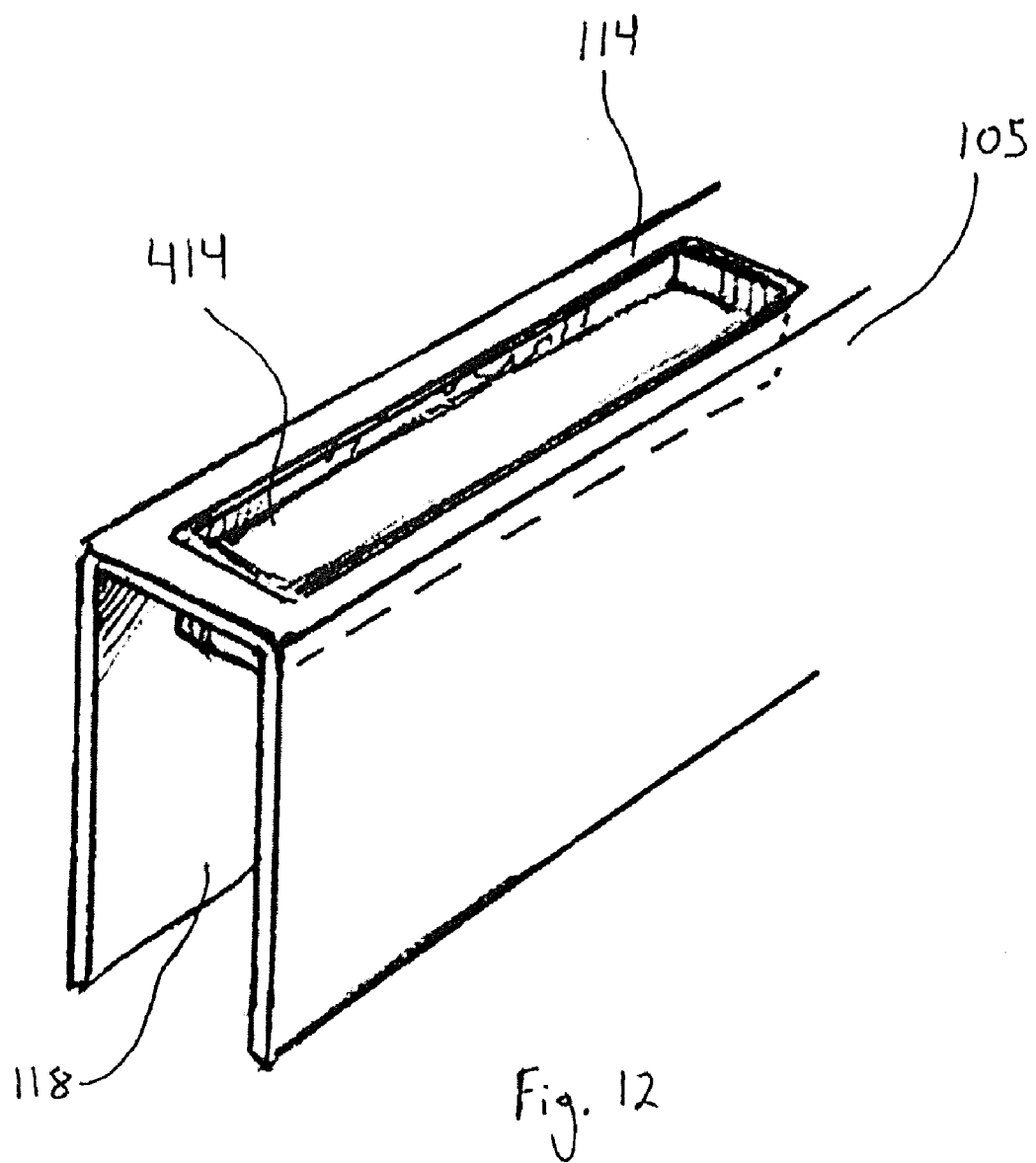
FIG. 12 is a more detailed perspective view of the retrofit tray shown in FIG. 5.

FIG. 12 illustrates one version of a tray (414) that may be incorporated into the sidewall (105) using methods described herein. It will be appreciated that the top surface (114), inner surface (106), and/or outer surface (110) may have any suitable cutout geometry for the insertion of any suitable accessory. For example, the cutout may be circular, triangular, a longitudinal channel, a cross-shape, and/or any polygonal shape. Support for an accessory, such as the tray (414) could include blocking, caulking under the top surface (114), support beams or support members extending to the floor of the tub, or any other suitable configuration.

Figure 13:
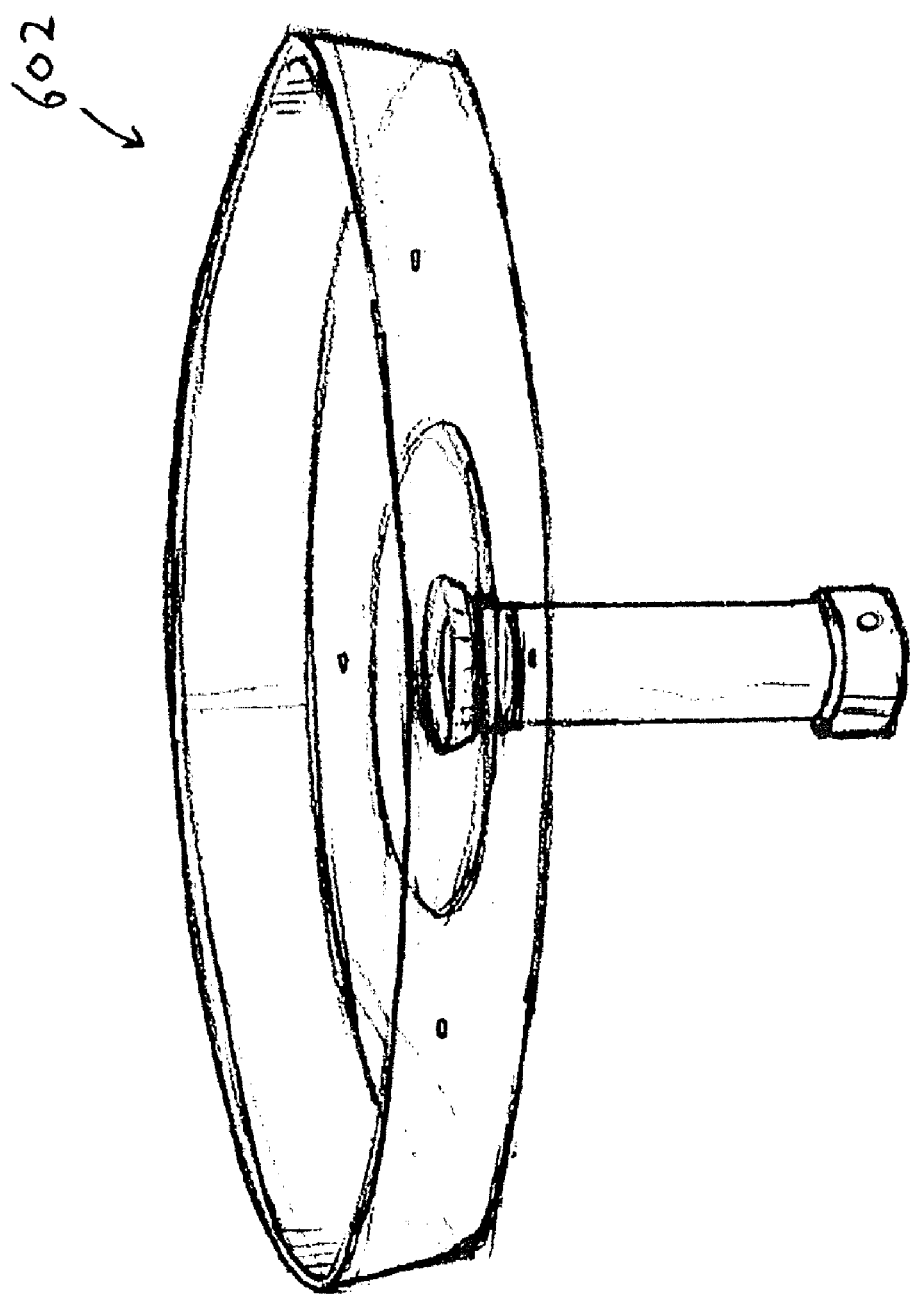
FIG. 13 is a perspective view of a tray accessory configured for attachment to a universal connector.
Figure 14:
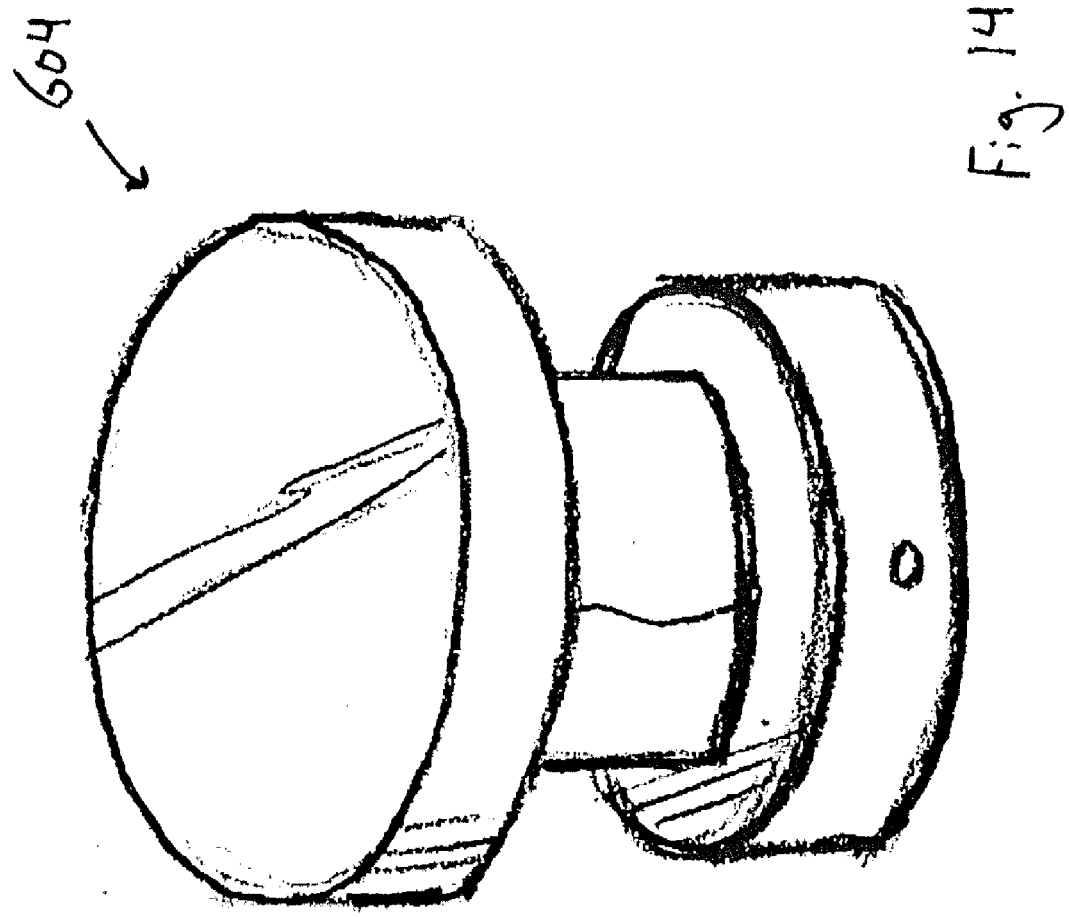
FIG. 14 is a perspective view of a knob or handle accessory configured for attachment to a universal connector.
Figure 15:
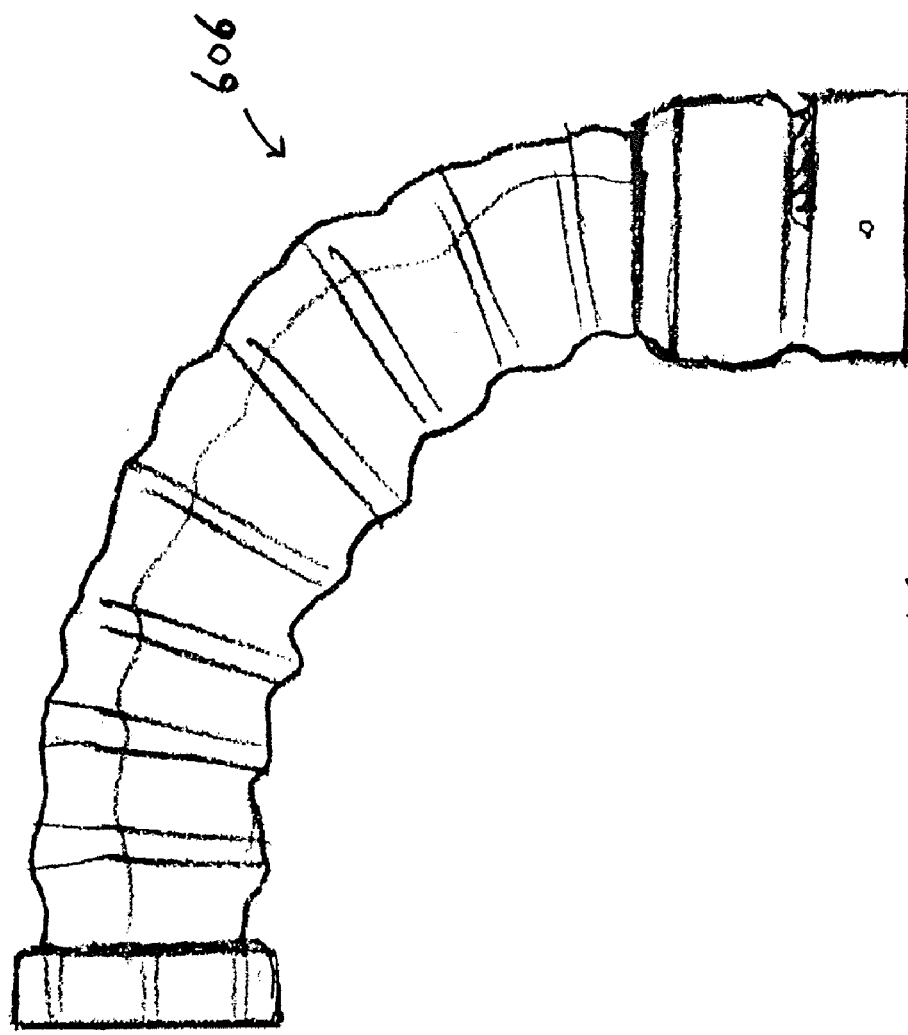
FIG. 15 is a perspective view of a hose accessory configured for attachment to a universal connector.

FIGS. 13-20 illustrate examples of accessories that can be coupled to a universal connector or may otherwise be associated with a bathtub in accordance with versions herein. FIG. 13 illustrates a tray (602) that may be used to hold bath products, or the like. FIG. 14 illustrates a knob (604) that may be gripped when entering a tub. Knob (604) may also be used, for example, as a cap for a universal connector when other attachments are not in use. FIG. 15 illustrates a hose (606), which may be coupled at the free end to a brush, dispenser, or other apparatus for which flexible tubing is desirable.

Figure 16:
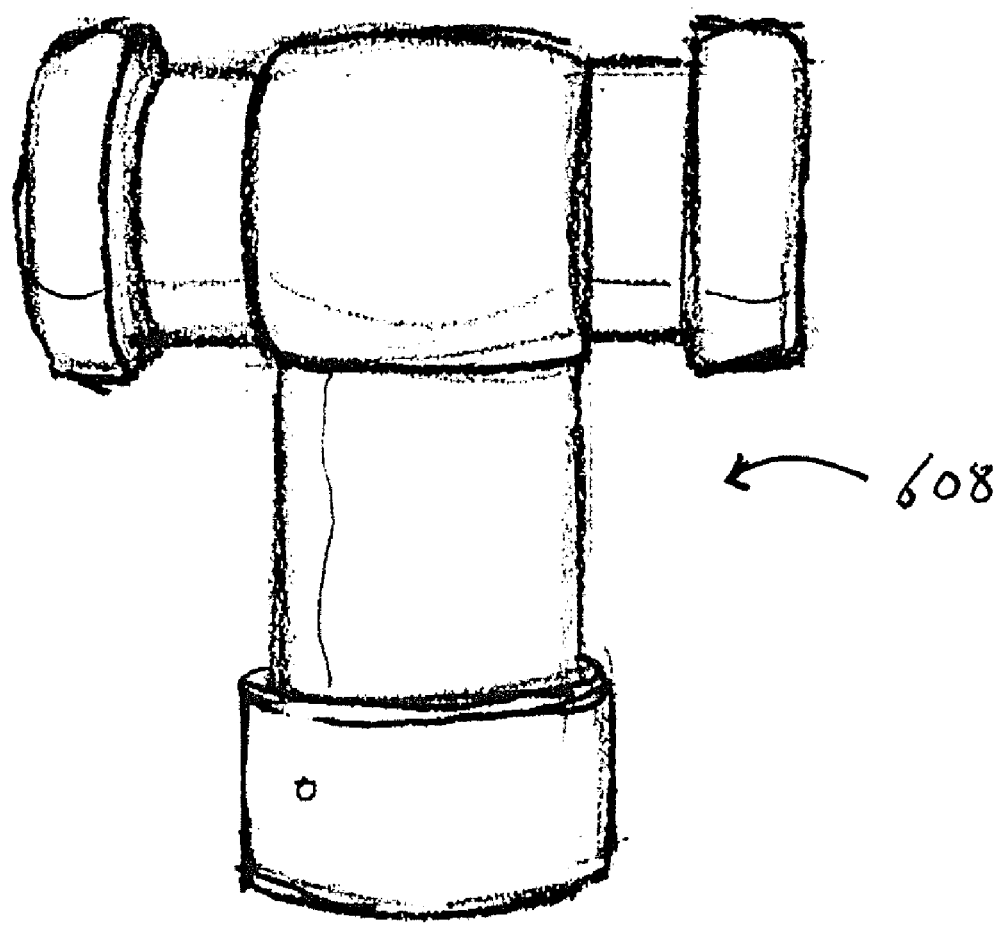
FIG. 16 is a perspective view of an adapter having multiple connectors configured for attachment to a universal connector.
Figure 17:
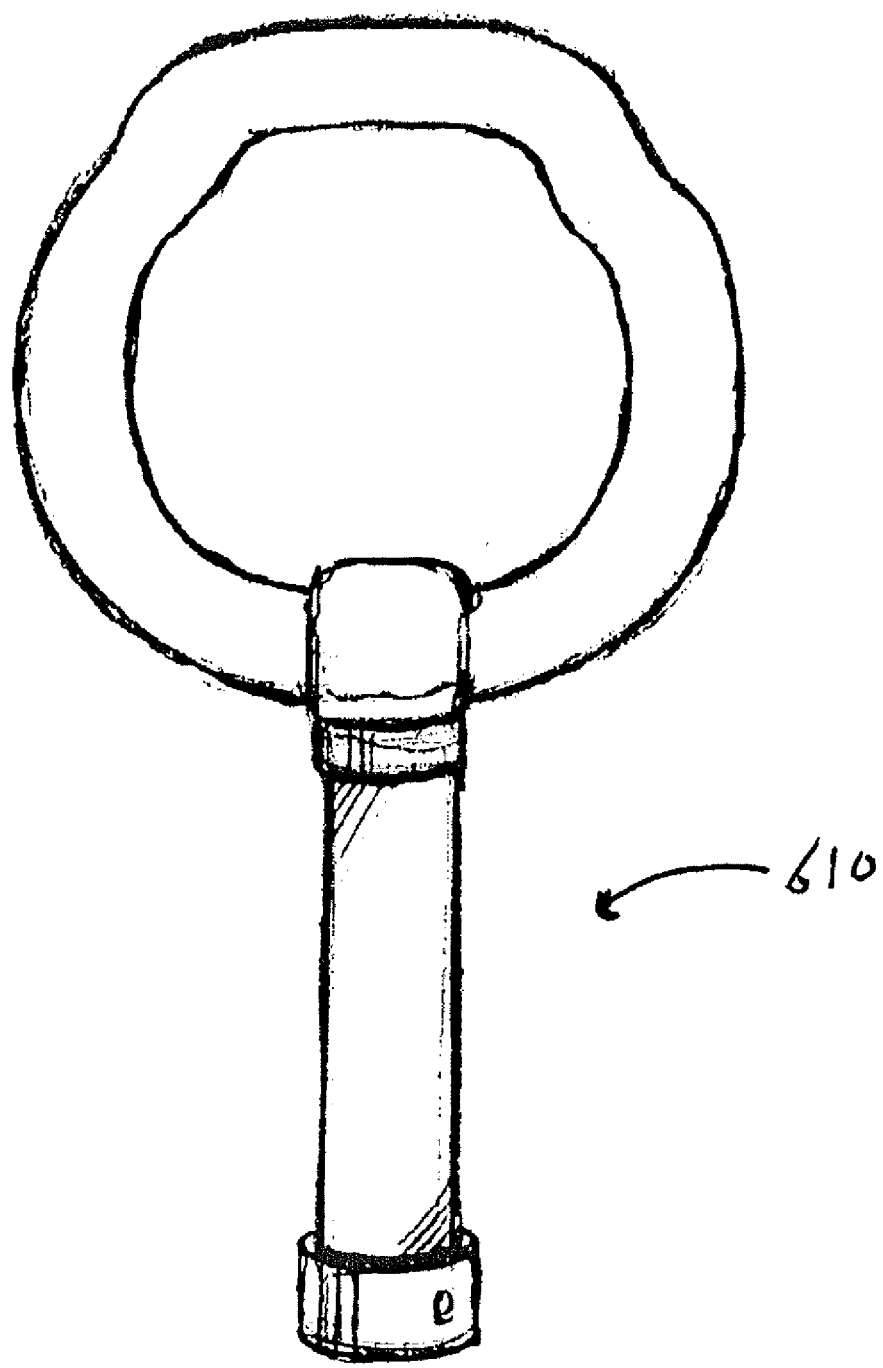
FIG. 17 is a perspective view of a support post and ring accessory configured for attachment to a universal connector.
Figure 18:
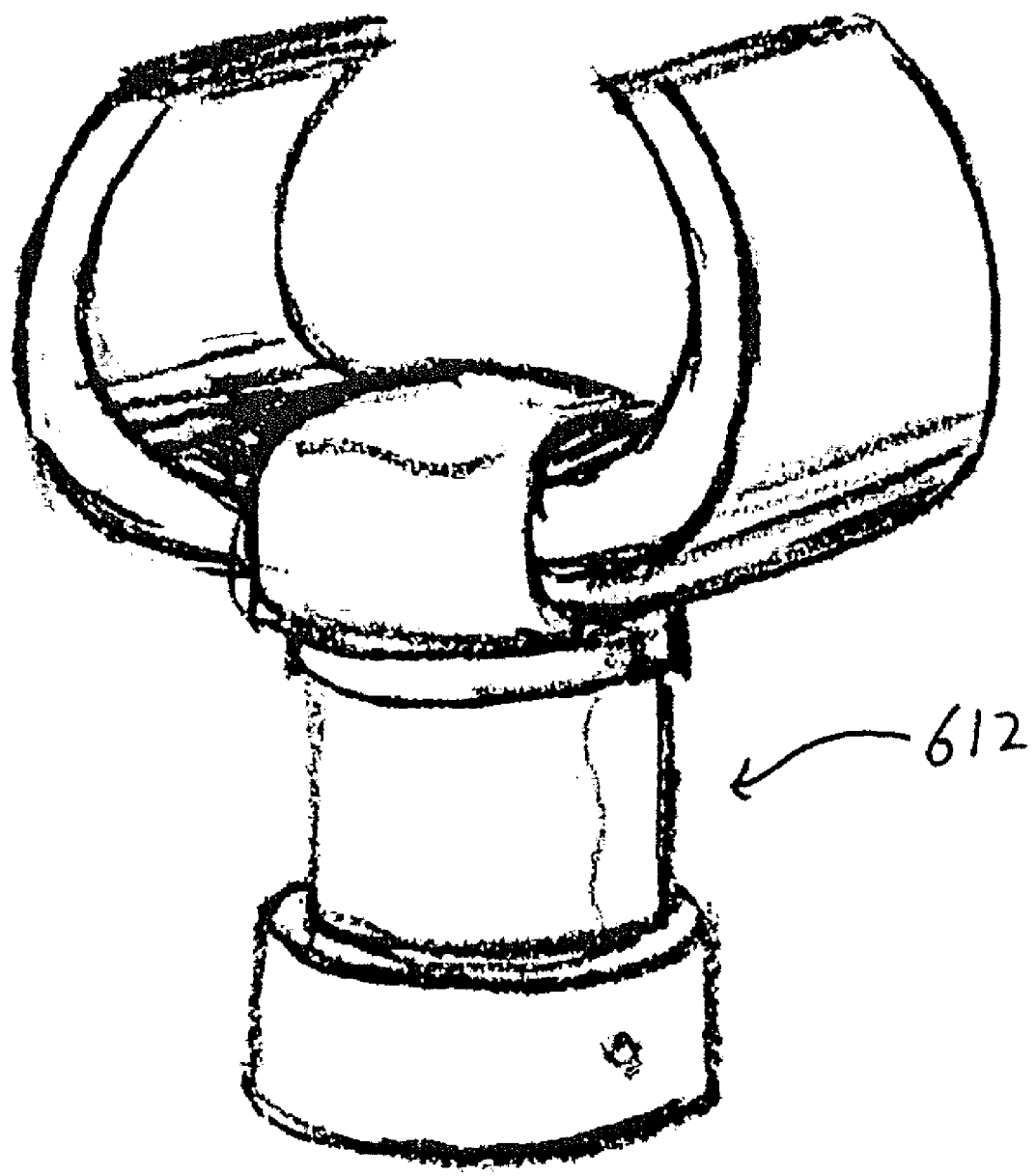
FIG. 18 is a perspective view of a hook or clasp accessory configured for attachment to a universal connector.
Figure 19:
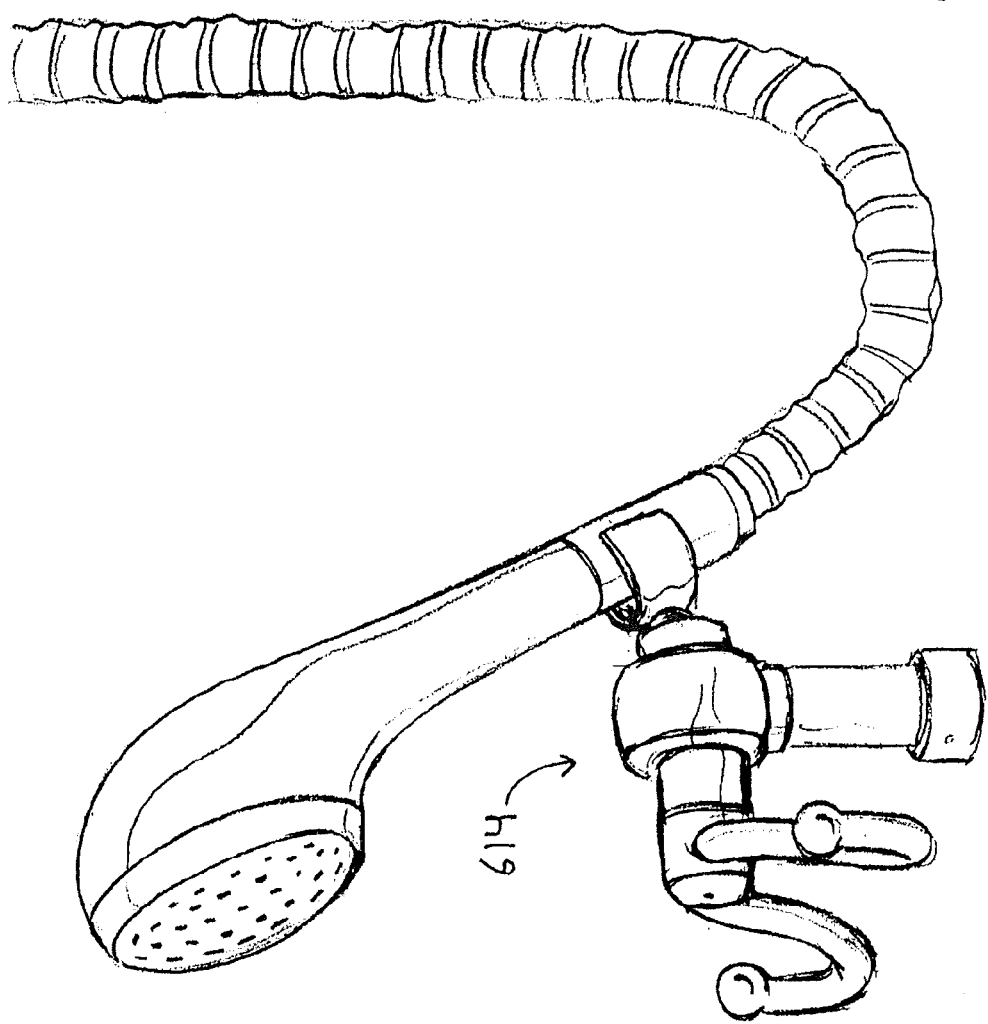
FIG. 19 is a perspective view of a shower head holding accessory configured for attachment to a universal connector.
Figure 20:
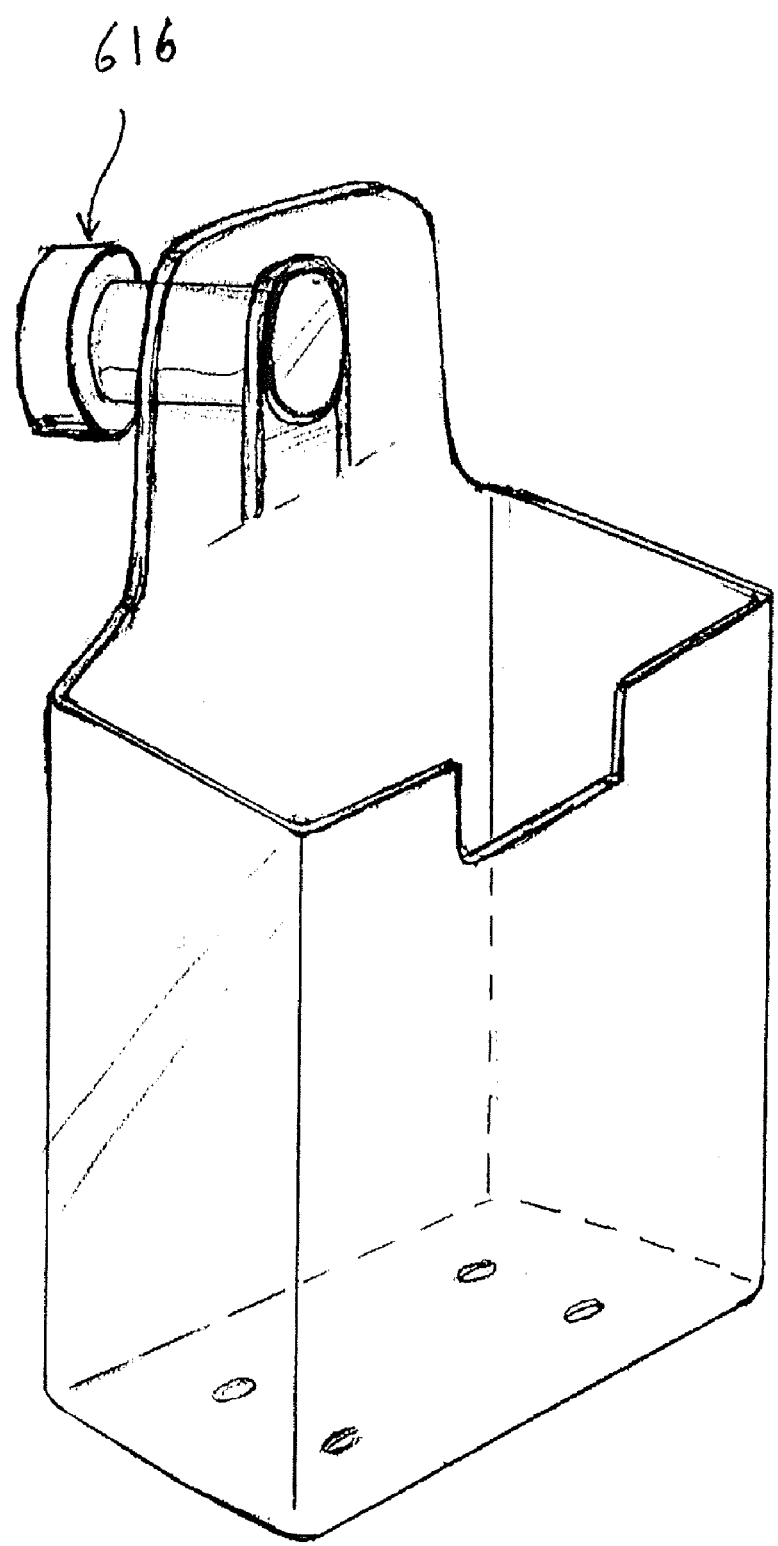
FIG. 20 is a perspective view of a caddy accessory configured for attachment to a universal connector.

FIG. 16 illustrates an adapter (608), which may be used with a single universal connector to provide multiple attachment points for various accessories. Any suitable number of adapter prongs or connections may be provided with any suitable configuration. FIG. 17 illustrates a support ring (610), which can be gripped by a user when entering a bathtub. FIG. 18 illustrates a clasp or hook (612) that can be used to retain articles. FIG. 19 illustrates a shower head support (614), which may make accessing a shower head easier for a bather. FIG. 20 illustrates a caddy (616), where the caddy (616) is one example of an accessory that may be associated, for example, with the inner surface (106) or outer surface (110) of a sidewall (105).

Figure 21:
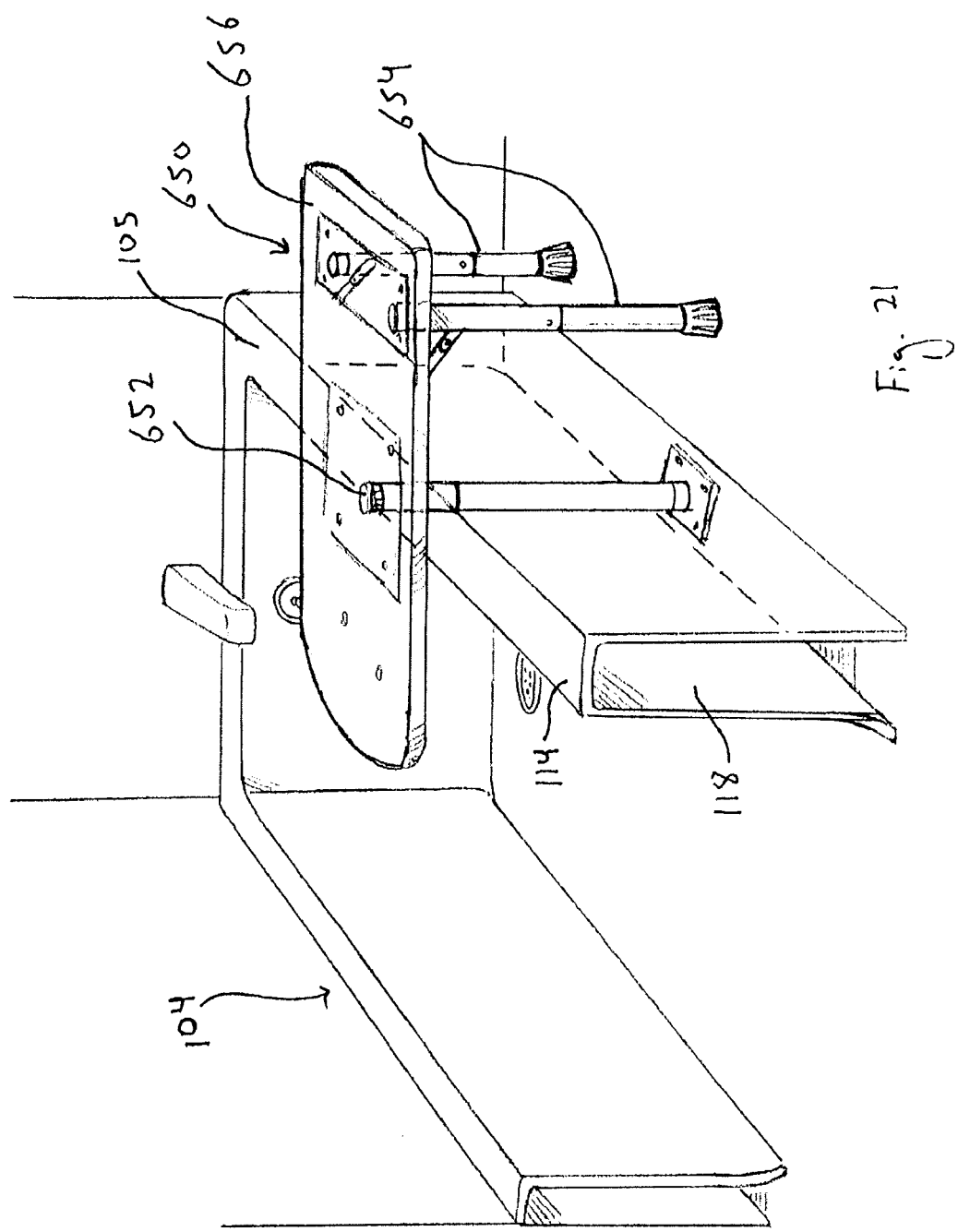
FIG. 21 is a perspective view of a bench accessory configured for attachment to a universal connector.

FIG. 21 illustrates one version of a bench (650) associated with a bathtub (104) and a universal connector. As illustrated, accessories such as bench (650) may be provided that use a universal connector (652) or coupling as one of a plurality of supports. For example, the bench (650) may have additional legs (654) to support a horizontal portion (656). In one version, the legs (654) are hinged or telescoping such that the legs can be adjusted before rotating the horizontal portion (656) about the universal connector (652) such that the legs (654) can be redeployed within the bathtub (114). In this manner the bench (650) can be used outside the bathtub (114) as well as inside the bathtub (114) without disconnecting the bench (650) from the universal connector (652).

Figure 22:
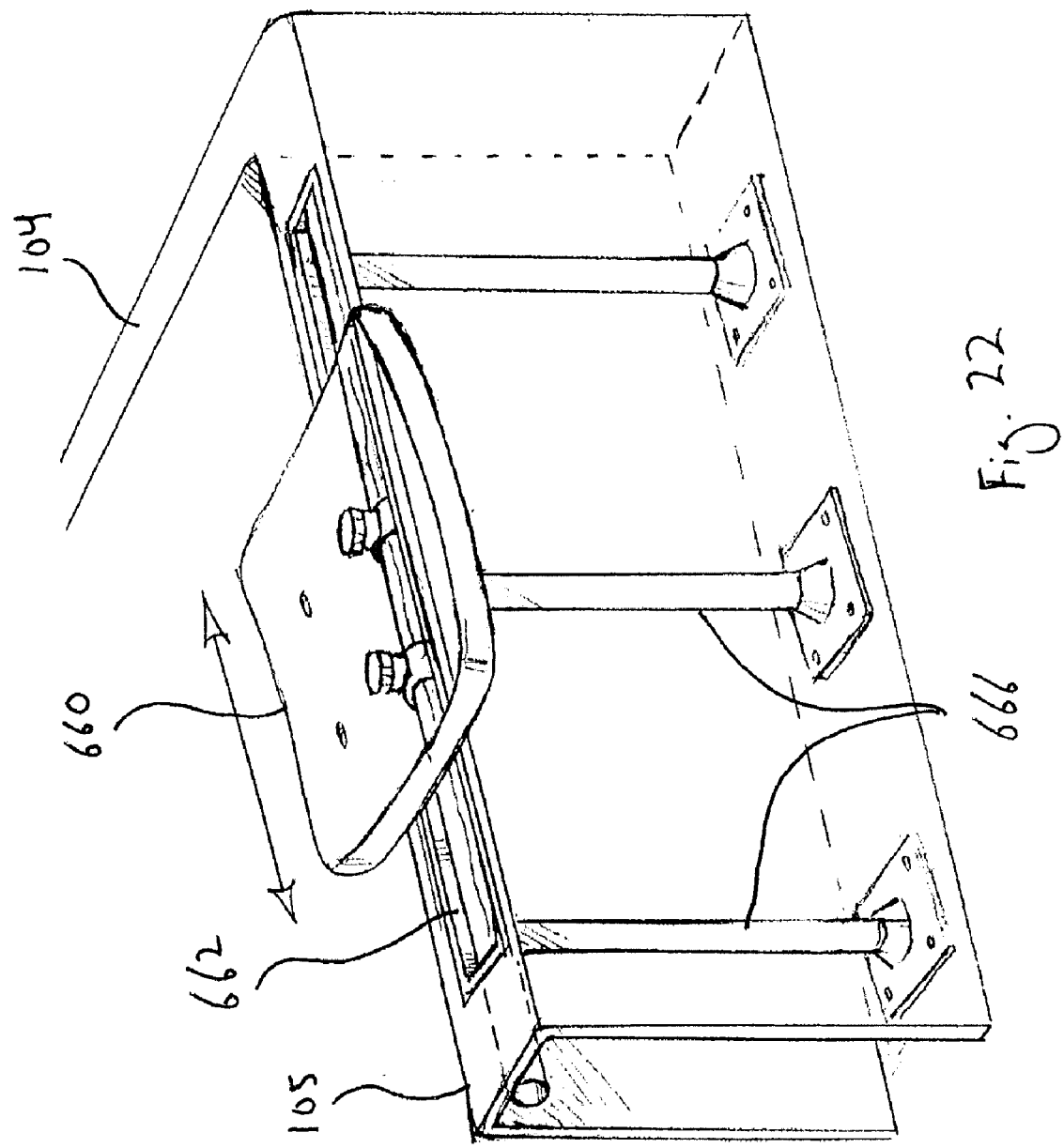
FIG. 22 is a perspective view of a sliding bench accessory configured for attachment to a universal connector.

FIG. 22 illustrates one version of a sliding bench (660) configured to travel along a channel (662) in the sidewall (105) of the bathtub (104). In the illustrated version, the sliding bench (660) travels along the length of the sidewall (105) on a horizontal guide (664) or pipe supported by one or a plurality of support members (666). The channel (662) and/or support members (666) may, for example, be installed in accordance with versions described herein.

Figure 23:
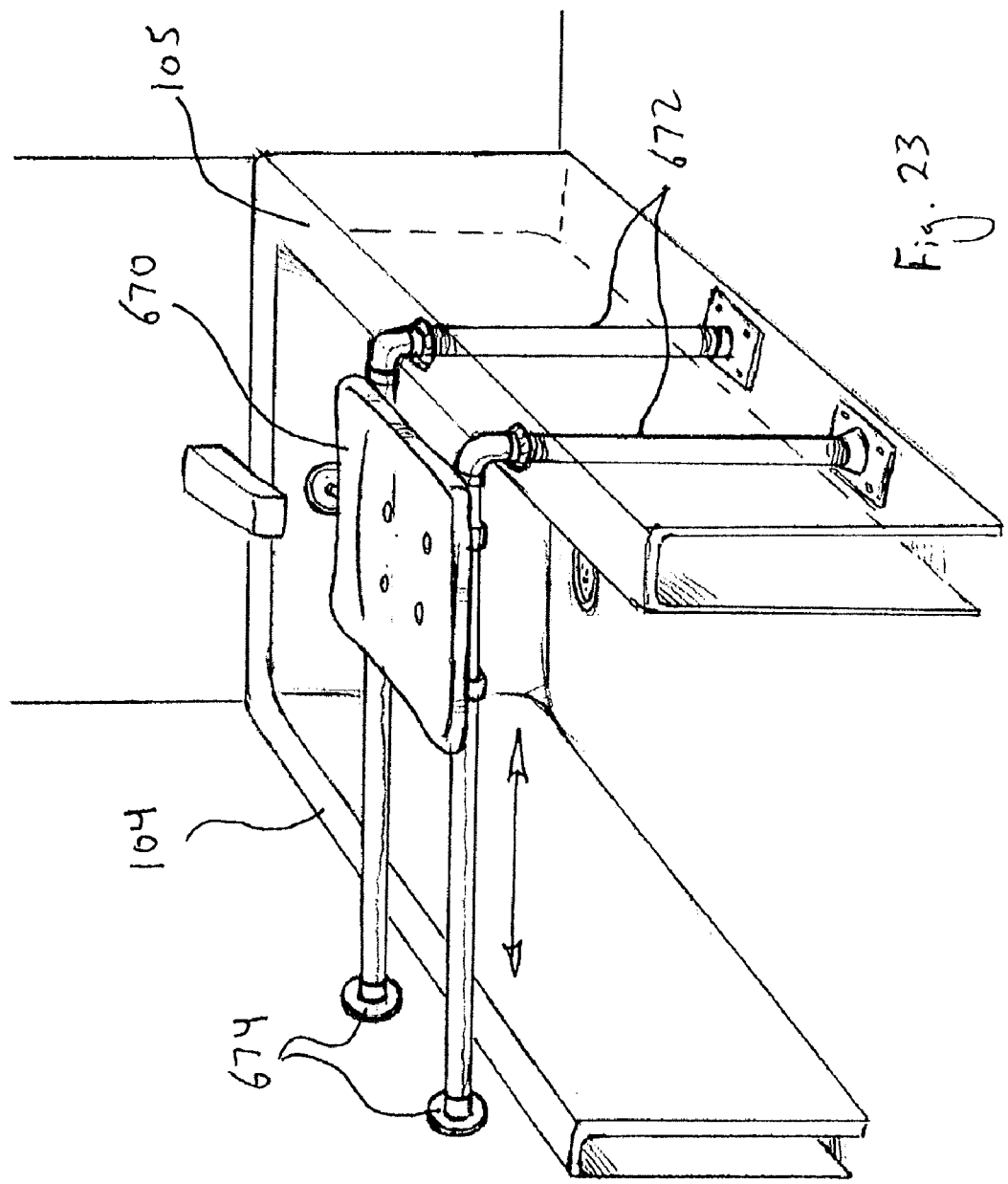
FIG. 23 is a perspective view of a transfer bench accessory configured for attachment to a universal connector.
Figure 25:
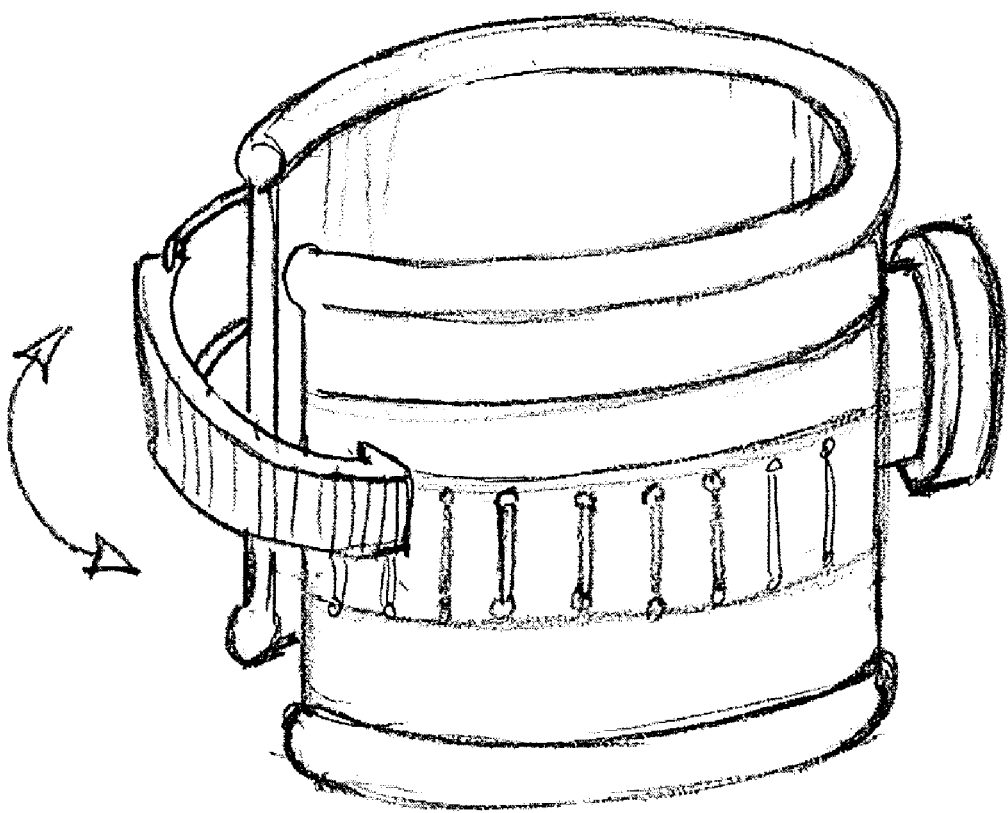
FIG. 25 is a perspective view of a clamp configured for attachment to a post or other member to allow for the attachment of accessories.
Figure 26:
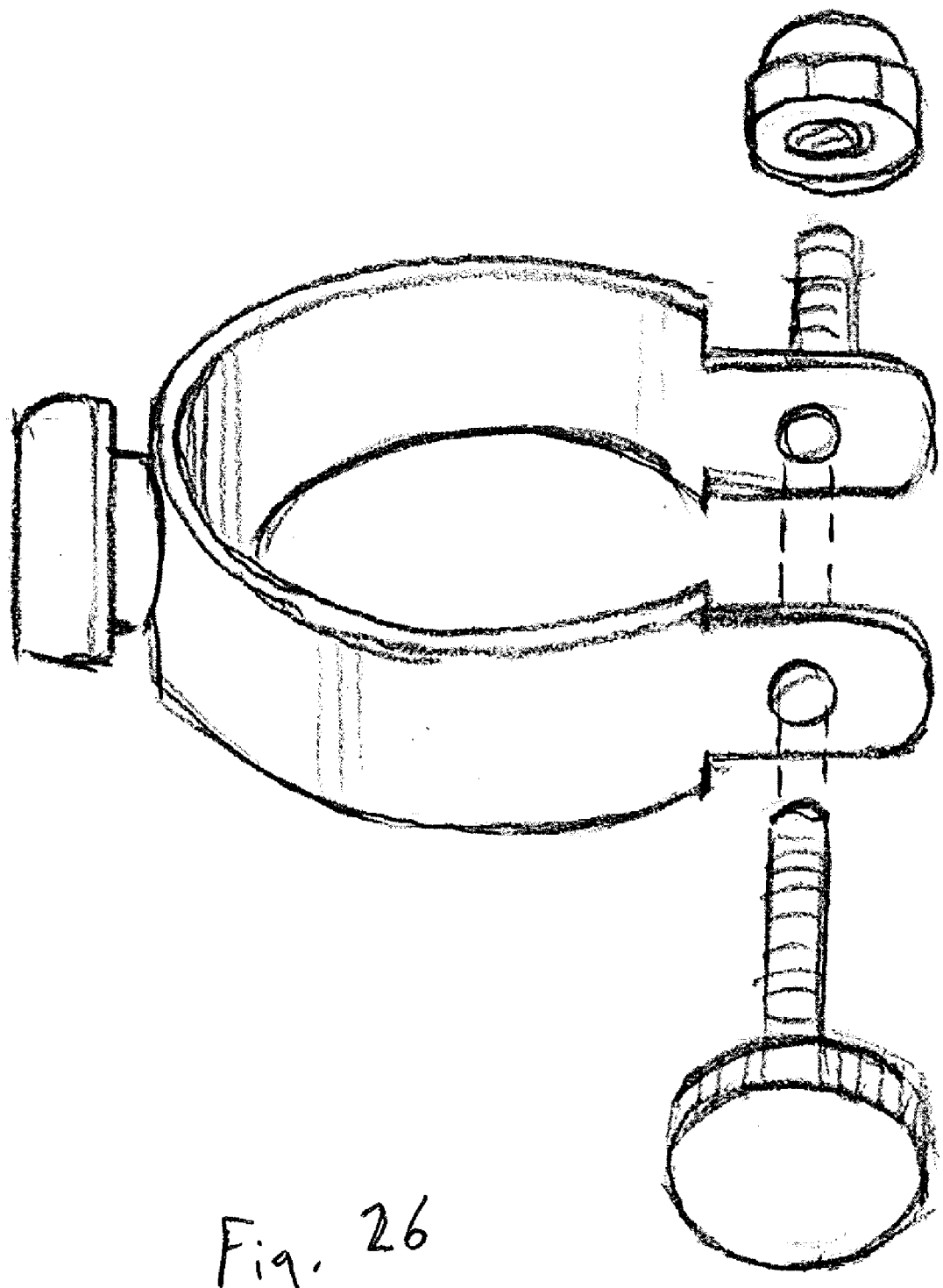
FIG. 26 is a perspective view of a clamp configured for attachment to a post or other member to allow for the attachment of accessories.
Figure 27:
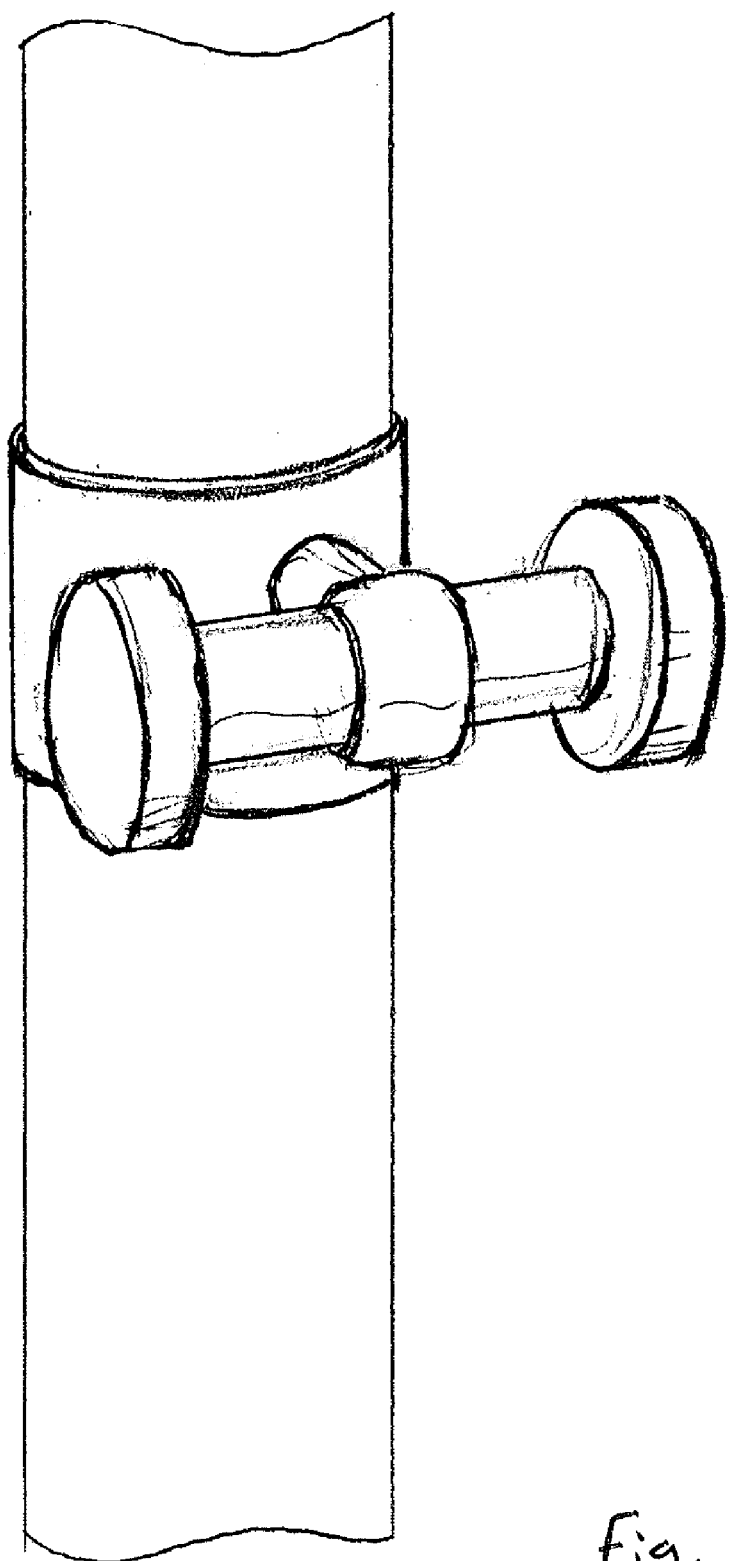
FIG. 27 is a perspective view of a clamp configured for attachment to a post or other member to allow for the attachment of accessories.
Figure 28:
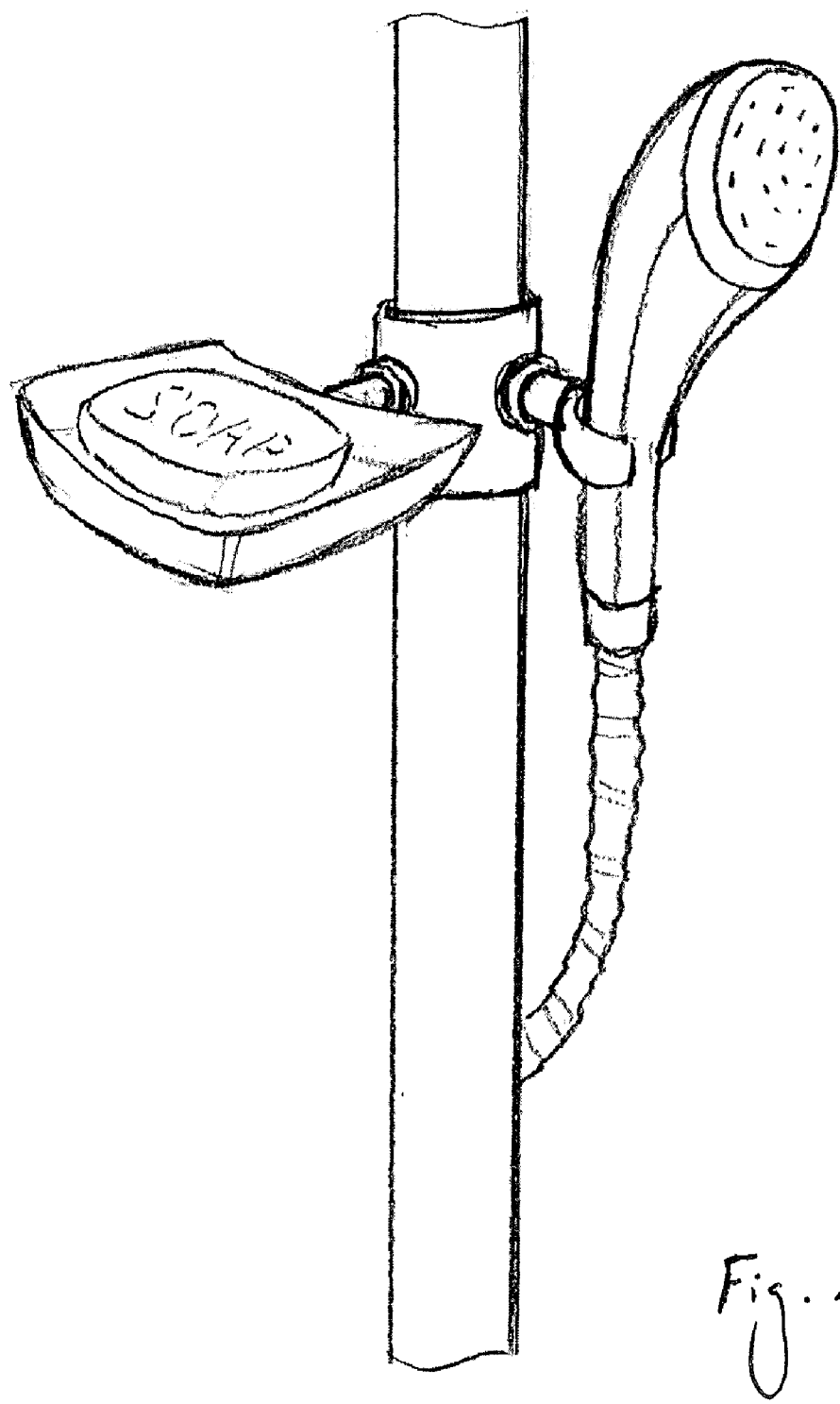
FIG. 28 is a perspective view of a clamp configured for attachment to a post or other member to allow for the attachment of accessories.
Figure 29:
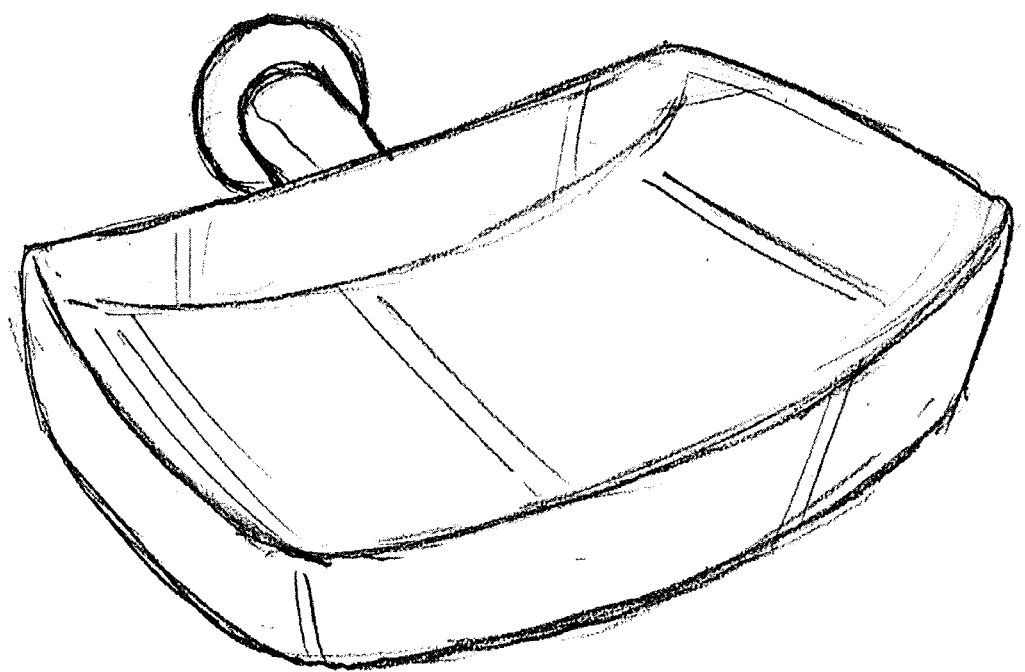
FIG. 29 is a perspective view of a tray configured for attachment to a post or other member.
Figure 30:
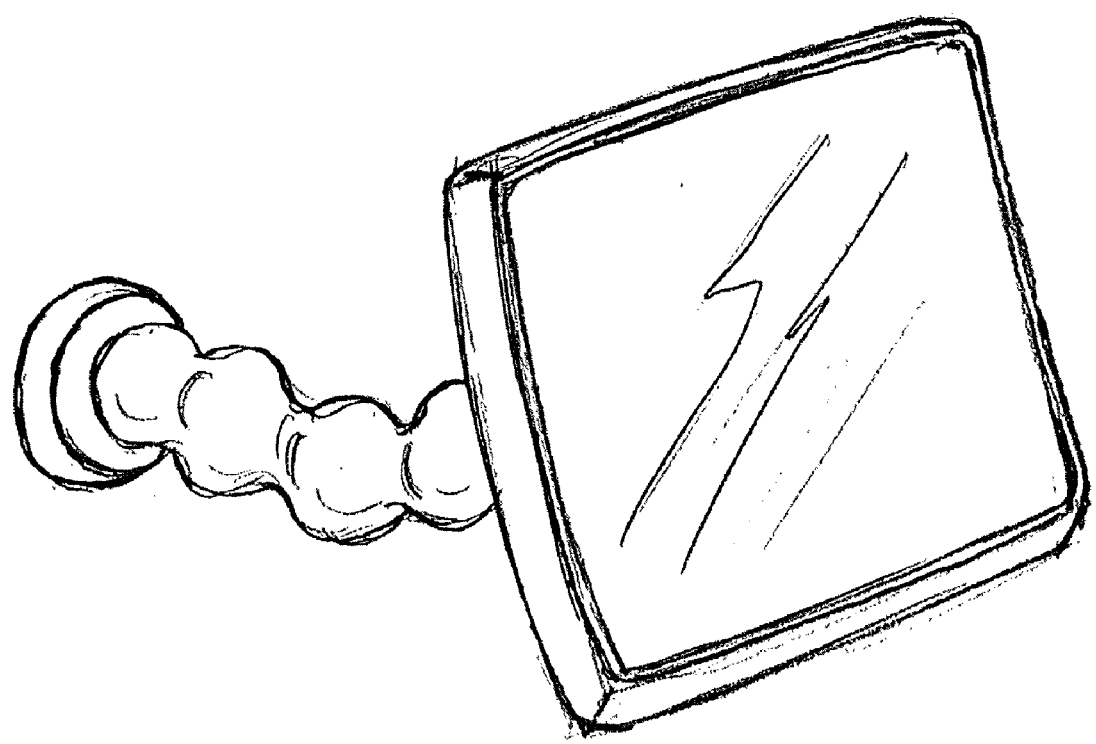
FIG. 30 is a perspective view of a tray configured for attachment to a post or other member.

FIG. 23 illustrates one version of a transfer bench (670) configured to travel perpendicular to the sidewall (105) of a bathtub (104). The transfer bench (670) may be associated with a plurality of universal connector and support systems (672). The transfer bench (670) may also be associated with couplings (674) associated with a wall or other portion of a bathtub to provide support.

While several bathtub connector devices and accessories have been discussed in detail above, it should be understood that the components, features, configurations, and methods of using the connector devices discussed are not limited to the contexts provided above. For example, although the illustrated versions involve a bathtub (104) that is built into a bathroom floor and/or wall, connector devices and accessories can be used in other contexts including free-standing tubs or shower stalls. In addition, components, features, configurations, and methods of use described in the context of one of the illustrated accessories may be incorporated into any of the other accessories.

Having shown and described various versions in the present disclosure, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. A method of installing a connector for bathtub accessories, the method comprising the steps of:
    forming a cutout in a bathtub, the bathtub comprising a sidewall having at least one surface and an inner cavity, wherein the cutout is formed in the sidewall of the bathtub such that the inner cavity is exposed;
    providing a universal connector;
    associating the universal connector with at least one surface of the sidewall of the bathtub;
    providing at least one fastener, the at least one fastener being configured to couple the universal connector to the top surface of the sidewall; and
    fastening the universal connector to the at least one surface of the sidewall with the at least one fastener by accessing the internal cavity of the sidewall through the cutout.

2. The method of claim 1, further comprising the step of installing a retrofit u-shaped step over the cutout in the bathtub to substantially seal the inner cavity.

3. The method of claim 1, further comprising the step of installing a retrofit door over the cutout in the bathtub to substantially seal the inner cavity.

4. The method of claim 1, wherein the step of associating the universal connector with the at least one surface of the sidewall comprises positioning the universal connector on a top surface of the sidewall.

5. The method of claim 1, further comprising the step of providing a hole in the at least one surface of the sidewall, wherein at least a portion of the universal connector is inserted through the hole.

6. The method of claim 1, wherein the at least one fastener comprises a toggle bolt.

7. The method of claim 1, further comprising the step of inserting a blocking member into the interior cavity of the sidewall, where the step of fastening the universal connector to the at least one surface of the sidewall comprises inserting the at least one fastener through the blocking member.

8. The method of claim 1, further comprising the step of attaching an accessory to the universal connector.

9. The method of claim 8, wherein the accessory is detachably coupled to the universal connector.

10. The method of claim 1, wherein the inner cavity is substantially watertight after fastening the universal connector to the at least one sidewall.

11. A method of installing a connector for bathtub accessories, the method comprising the steps of:
    forming a cutout in a bathtub, the bathtub comprising a sidewall having at least one surface and an inner cavity, wherein the cutout is formed in the sidewall of the bathtub such that the inner cavity is exposed;
    providing a connector, the universal connector being configured for attachment to an accessory;
    providing a support system, the support system being associated with the connector, wherein the support system comprises a vertical support member;
    positioning the support system within the inner cavity of the sidewall; and
    associating the connector with the at least one surface of the sidewall and the support system.

12. The method of claim 11, further comprising the step of installing a retrofit step to cover the cutout and substantially seal the inner cavity in the sidewall.

13. The method of claim 11, further comprising the step of installing a retrofit door to cover the cutout and substantially seal the inner cavity of the sidewall.

14. The method of claim 11, further comprising the step of attaching an accessory to the connector.

15. The method of claim 14, wherein the accessory is detachably coupled to the connector.

16. The method of claim 11, wherein the support system comprises a vertical support member associated with a base, wherein the base is affixed to the floor of the bathtub.

17. The method of claim 11, wherein the support system is configured to bear the load placed upon the connector.

18. The method of claim 11, wherein the step of providing a connector comprises providing multiple connectors.

19. The method of claim 11, wherein the step of associating the connector with the at least one surface of the sidewall comprises fixedly attaching the connector to the top surface of the sidewall of the bathtub.

20. The method of claim 11, wherein the connector and the vertical support member are integral.

* * * * *